(12) United States Patent
Taxon et al.

(10) Patent No.: US 11,668,262 B2
(45) Date of Patent: Jun. 6, 2023

(54) METHODS AND SYSTEM FOR DIAGNOSING A HIGH-PRESSURE FUEL PUMP IN A FUEL SYSTEM

(71) Applicant: Transportation IP Holdings, LLC, Norwalk, CT (US)

(72) Inventors: Morse N. Taxon, Erie, PA (US); Pradheepram Ottikkutti, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 51 days.

(21) Appl. No.: 17/329,424

(22) Filed: May 25, 2021

(65) Prior Publication Data

US 2021/0277845 A1 Sep. 9, 2021

Related U.S. Application Data

(60) Continuation-in-part of application No. 16/694,984, filed on Nov. 25, 2019, now Pat. No. 11,306,676, (Continued)

(51) Int. Cl.
*F02D 41/22* (2006.01)
*F02D 41/38* (2006.01)
(Continued)

(52) U.S. Cl.
CPC ....... *F02D 41/3854* (2013.01); *F02D 41/221* (2013.01); *F02D 41/3827* (2013.01); *F02D 41/3845* (2013.01); *F02D 41/407* (2013.01); *F02M 59/367* (2013.01); *F23K 5/04* (2013.01); *F02D 41/009* (2013.01);
(Continued)

(58) Field of Classification Search
CPC ............ F02D 41/3845; F02D 41/3854; F02D 41/221; F02D 41/222; F02D 2041/224; F02D 2041/3881; F02D 2041/223; F02D 2041/225; F02D 2041/226; F02D 2200/0602; F02D 2250/31; F02M 63/0225; F02M 63/0285; F02M 63/024; F02M 59/367; F02M 37/043; F23K 5/04
See application file for complete search history.

(56) References Cited

U.S. PATENT DOCUMENTS 5,201,294 A * 4/1993 Osuka ................ F02M 63/0225
123/456
6,267,452 B1 7/2001 Lin
(Continued)

FOREIGN PATENT DOCUMENTS

WO 2014189458 A1 11/2014

*Primary Examiner* — Gonzalo Laguarda
(74) *Attorney, Agent, or Firm* — McCoy Russell LLP

(57) ABSTRACT

Systems and methods are provided herein for tracking degradation of a high-pressure fuel pump. In one example, a fuel system controller is configured to receive an output pressure signal from a pressure sensor, transform the output pressure signal to the frequency domain to generate frequency content of the output pressure signal, and diagnose a condition of a fuel pump based at least in part on the frequency content of the output pressure signal, the fuel pump fluidly coupled to a fuel injector via a common fuel rail, and the fuel injector is operable to inject fuel to a cylinder of an engine.

18 Claims, 11 Drawing Sheets

Related U.S. Application Data which is a division of application No. 15/839,670, filed on Dec. 12, 2017, now Pat. No. 10,526,994.

(60) Provisional application No. 62/451,843, filed on Jan. 30, 2017.

(51) Int. Cl.
| | | |
|---|---|---|
| *F02M 59/36* | (2006.01) | |
| *F23K 5/04* | (2006.01) | |
| *F02D 41/40* | (2006.01) | |
| F02M 63/02 | (2006.01) | |
| F02D 41/00 | (2006.01) | |
| F02M 59/34 | (2006.01) | |

(52) U.S. Cl.
CPC ............... *F02D 2041/224* (2013.01); *F02D 2041/3881* (2013.01); *F02D 2200/0602* (2013.01); *F02D 2250/31* (2013.01); *F02M 59/34* (2013.01); *F02M 63/0285* (2013.01)

(56) References Cited

U.S. PATENT DOCUMENTS

| | | | |
|---|---|---|---|
| 6,311,674 B1* | 11/2001 | Igashira | F02D 41/408 |
| | | | 123/496 |
| 6,715,468 B2 | 4/2004 | Uchiyama et al. | |
| 7,798,872 B2* | 9/2010 | Fujino | B63H 21/38 |
| | | | 123/497 |
| 8,516,995 B2* | 8/2013 | Sinclair | F02D 41/221 |
| | | | 417/298 |
| 9,303,583 B2* | 4/2016 | Surnilla | F02M 63/029 |
| 10,267,282 B2* | 4/2019 | Anandhan | F02M 63/0052 |
| 10,526,994 B2* | 1/2020 | Taxon | F02D 41/3827 |
| 11,306,676 B2* | 4/2022 | Taxon | F02M 59/367 |
| 2007/0023009 A1* | 2/2007 | Elliott | F02M 59/366 |
| | | | 123/446 |
| 2009/0318157 A1 | 12/2009 | Hoshino et al. | |
| 2009/0319157 A1* | 12/2009 | Ishizuka | F02D 41/2467 |
| | | | 701/106 |
| 2012/0065868 A1 | 3/2012 | Ando | |
| 2013/0013174 A1 | 1/2013 | Nistler et al. | |
| 2013/0013175 A1 | 1/2013 | Nistler et al. | |
| 2016/0025030 A1 | 1/2016 | Ulrey et al. | |

\* cited by examiner

METHODS AND SYSTEM FOR DIAGNOSING A HIGH-PRESSURE FUEL PUMP IN A FUEL SYSTEM

CROSS REFERENCE TO RELATED APPLICATIONS

The present application is a continuation-in-part of U.S. patent application Ser. No. 16/694,984 entitled "METHODS AND SYSTEM FOR DIAGNOSING A HIGH-PRESSURE FUEL PUMP IN A FUEL SYSTEM", and filed on Nov. 25, 2019. U.S. patent application Ser. No. 16/694,984 is a divisional of U.S. Non-Provisional patent application Ser. No. 15/839,670 entitled "METHODS AND SYSTEM FOR DIAGNOSING A HIGH-PRESSURE FUEL PUMP IN A FUEL SYSTEM", and filed on Dec. 12, 2017. U.S. Non-Provisional patent application Ser. No. 15/839,670 claims priority to U.S. Provisional Patent Application No. 62/451,843, entitled "METHODS AND SYSTEM FOR A FUEL SYSTEM," filed Jan. 30, 2017. The entire contents of each of the above-referenced applications are hereby incorporated by reference for all purposes.

BACKGROUND

Technical Field

Embodiments of the subject matter disclosed herein relate to a fuel system for an engine.

Discussion of Art

Vehicles, such as rail vehicles, include power sources, such as reciprocating internal combustion diesel engines. In some vehicles, fuel is provided to the diesel engine by a common rail fuel system. One type of common rail fuel system comprises a low-pressure fuel pump in fluid communication with a high-pressure fuel pump, and a fuel rail in fluid communication with the high-pressure fuel pump and further in fluid communication with at least one fuel injector fitted in to at least one engine cylinder. The high-pressure fuel pump pressurizes fuel for delivery to the fuel injector through the fuel rail. Fuel travels through the fuel rail to at least one fuel injector, and ultimately to at least one engine cylinder of the power source such as an engine where fuel is combusted to provide power to the vehicle.

In order to reduce the likelihood of engine degradation and/or consequential engine damage caused by pump deterioration, the fuel system may be monitored for changes (increase/decrease) in fuel injection quantity with reference to pre-set/commanded fuel quantity, fuel leaks, degraded components, and/or other issues. For example, fuel flow reductions upstream of the fuel rail may be caused by a degraded inlet metering valve (IMV) or by a degraded high-pressure fuel pump (HPFP), but typically or by default the inlet metering valve is identified as the degraded component. When the flow reduction is instead caused by the high-pressure fuel pump, time and money may be wasted replacing the inlet metering valve and/or engine performance may continue to degrade, leading to vehicle operator frustration, increased maintenance costs, stranded vehicles, and customer (such as a rail road company or a marine transport company) dissatisfaction.

BRIEF DESCRIPTION

In one embodiment, a fuel system controller is configured to receive an output pressure signal from a pressure sensor, transform the output pressure signal to the frequency domain to generate frequency content of the output pressure signal, and diagnose a condition of a fuel pump based at least in part on the frequency content of the output pressure signal, the fuel pump fluidly coupled to a fuel injector via a common fuel rail, and the fuel injector is operable to inject fuel to a cylinder of an engine In this way, the output from the pressure sensor (which may be a fast-response sensor that may measure pressure at a high rate, e.g. >2,000 times engine crank speed), which is positioned and configured to measure fuel rail pressure, may be analyzed to identify impending or current fuel pump degradation. In one example, the fuel pump may be a multi-piston pump having a plurality of pumping chambers (also referred to as pumping cylinders), with each pumping chamber comprising a check valve which delivers fuel to the high-pressure fuel rail, an inlet check valve, a reciprocating plunger, and a pump housing with a bore in which the plunger oscillates. Each time a pumping action occurs in a pumping chamber, a pulse of pressure is detectable by a pressure sensor in communication with the high-pressure reservoir and fuel lines. Based on the frequency, magnitude, and/or width of the pressure pulses, and/or based on the frequency content of the output of the pressure sensor, one or more pumping chambers may be identified as becoming weaker or non-functional (e.g., producing less pressure than the other pumping chambers and/or producing less pressure than a pre-set reference pressure for the specific operating condition of the engine). When weak or non-functional pumping chambers are identified, an operator may be notified of the degradation condition of the fuel pump so that maintenance may be performed and/or engine operation may be adjusted to avoid subsequent engine degradation, failure, or damage.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to various embodiments of diagnosing a condition of a fuel pump. Specifically, a change in performance of the fuel pump may be predicted or identified from the signal output of a fuel rail pressure sensor. The change in performance may include a reduction in fuel output flow caused by a degraded check valve of a pumping chamber of the fuel pump. By identifying the imminent or already occurring change in performance of the fuel pump, and further by differentiating the change in performance from degradation due to a fuel flow control valve, such as an IMV, upstream of the fuel pump, maintenance may be performed or engine operation may be adjusted before total pump failure leads to engine degradation and/or damage, thus avoiding costly repairs and vehicle down-time.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV).

Figure 1:
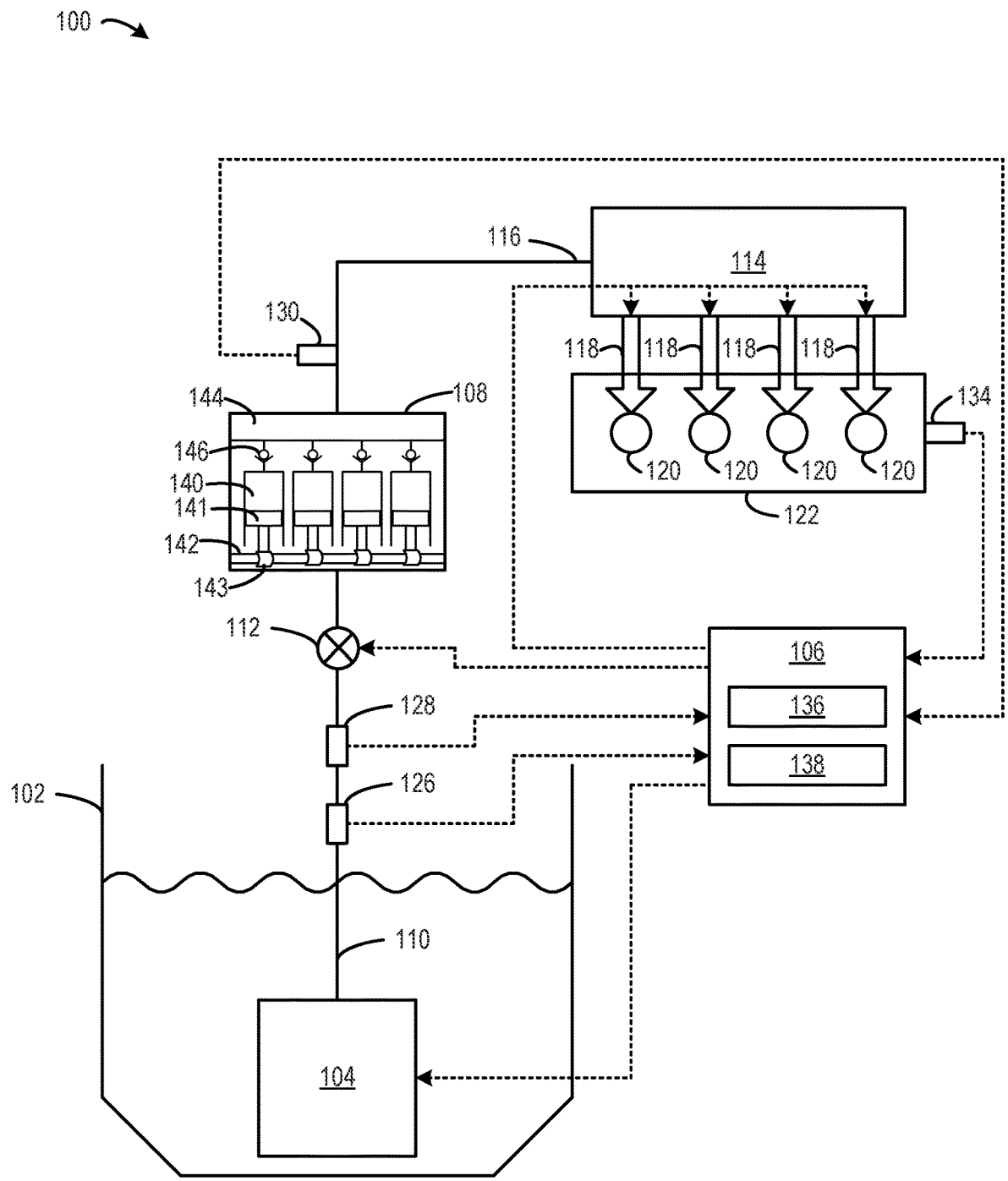
FIG. 1 schematically shows a first embodiment of a common rail fuel system of the present disclosure.

Before further discussion of the approach for diagnosing the condition, an example of a platform is disclosed in which an engine may be configured for a vehicle. The present description relates to vehicles, such as rail vehicles and marine vessels, that include an engine (such as a reciprocating internal combustion diesel engine) where fuel is provided to the engine through a common rail fuel system (CRFS). As shown in FIG. 1, a CRFS includes a common fuel rail that provides fuel to a plurality of fuel injectors for fuel injection into individual cylinders of the engine. In one example, the CRFS includes an inlet metering valve (IMV) that is positioned between a low-pressure fuel pump and a high-pressure fuel pump. The IMV is operable to control fuel flow to the high-pressure fuel pump that supplies the common fuel rail with high pressure fuel. An amount of electrical current supplied to the IMV can be adjusted via an electronic control unit/module (ECU/ECM) to vary the position of the IMV's plunger, and thus effect a variable flow control orifice, hence varying an amount of fuel provided to the common fuel rail as operation conditions of the engine change.

Fuel system characteristic maps (e.g., electrical current applied to achieve a given IMV internal spool/plunger position) may be used as a reference to diagnose fuel system component degradation in addition to controlling rail pressure of the common fuel rail. However, these maps may not accurately differentiate between all sources of high-pressure fuel pump degradation. As such, the default maintenance action performed in response to an indication of high-pressure fuel pump degradation may include replacing the IMV. If the IMV is functional and the degradation is instead due to a degraded high-pressure fuel pump check valve(s) or cam lobe(s), unnecessary maintenance may be performed on the IMV and the vehicle may continue to operate with a degraded high-pressure fuel pump, leading to engine degradation and subsequent engine shut-down. Also, if the IMV is fully functional and the degradation in rail fuel pressure is due to possible degradation of pump piston or pump chamber/cylinder or pump tappet or other components, unnecessary replacements of the IMV, which will lead to continued degradation in engine operation and subsequent engine shut-down, may be avoided or reduced.

Thus, according to embodiments disclosed herein, check valve(s) or cam lobe(s) degradation of a high-pressure fuel pump may be identified based on a pressure signal output from a fuel rail pressure sensor, as described in more detail below. While the embodiments disclosed herein are described with respect to a high-pressure pump that is configured to receive fuel from a low-pressure pump, the diagnostic routine for determining degradation of the fuel pump may be applied to other suitable pumps, such as fuel pumps that receive fuel directly from a fuel tank. As used herein, "high-pressure fuel pump" may include a fuel pump that pressurizes fuel to a higher pressure than another, lower-pressure fuel pump in the fuel system. Additionally or alternatively, "high-pressure fuel pump" may include a fuel pump that pressurizes fuel to a pressure greater than a threshold pressure, such as to a pressure equal to a commanded pressure of a coupled fuel rail (e.g., 2200 bar).

FIG. 1 includes a block diagram of a CRFS 100 for an engine of a vehicle, such as a rail vehicle. In one example, the rail vehicle is a locomotive. In alternative embodiments, the engine may be in another type of off-highway vehicle, on-highway vehicle, stationary power plant, marine vessel, or others. Liquid fuel is sourced or stored in a fuel tank 102. A low-pressure fuel pump 104 is in fluid communication with the fuel tank 102. In this embodiment, the low-pressure fuel pump 104 is disposed inside of the fuel tank 102 and can be immersed below the liquid fuel level. In alternative embodiments, the low-pressure fuel pump may be coupled to the outside of the fuel tank and pump fuel through a suction device or feature. Operation of the low-pressure fuel pump 104 is regulated by a controller 106 (such as an ECU or ECM). The low pressure fuel pump 104 may be any one of engine driven (through cam, gear, belt, chain or such other drive mechanism) or independent electrically or hydraulically driven.

Liquid fuel is pumped by the low-pressure fuel pump 104 from the fuel tank 102 to a high-pressure fuel pump 108 through a conduit 110. A valve 112 is disposed in the conduit 110 and regulates fuel flow through the conduit 110. For example, the valve 112 is an inlet metering valve. The IMV 112 is disposed upstream of the high-pressure fuel pump 108 to adjust a flow rate, and to meter the appropriate quantity, of fuel that is provided to the high-pressure fuel pump 108 and further to a common fuel rail 114 for distribution to a plurality of fuel injectors 118 for fuel injection into the engine cylinders. For example, the IMV 112 may be a proportional solenoid valve or proportional spool valve, opening and closing of which is regulated by the controller 106. In other words, the controller 106 commands the IMV to be fully closed, fully open, or a position in between fully closed and fully opened in order to control fuel flow to the high-pressure fuel pump 108 to a commanded fuel flow rate as dictated by the controller 106. During operation of the vehicle/engine, the IMV 112 is adjusted to meter fuel based on operating conditions, and during at least some conditions may be at least partially open. It is to be understood that the solenoid based inlet metering valve is merely one example of a control device for metering fuel and any suitable control element may be employed without departing from the scope of this disclosure. For example, a position or state of the IMV may be electrically controlled by controlling an IMV electrical current. As another example, a position or state of the IMV may be mechanically, hydraulically, hydro-mechanically, electrically, electro-mechanically, magnetically, or electro-magnetically controlled by controlling a servo motor that adjusts the IMV.

The high-pressure fuel pump 108 increases fuel pressure from a lower pressure to a higher pressure. The high-pressure fuel pump 108 is fluidly coupled with the common fuel rail 114. The high-pressure fuel pump 108 delivers fuel to the common fuel rail 114 through a conduit 116. In the example illustrated in FIG. 1, the high-pressure fuel pump 108 is a multi-piston pump that includes a plurality of pumping chambers. Each pumping chamber may comprise a cylinder with each cylinder housing a piston and check valve. The cylinders of the pump may be configured radially, axially, or in-line. As shown, the pump includes four pumping chambers (e.g., four pistons, one in each of four cylinders) arranged inline, including cylinder 140 housing piston 141. For example, the pistons may be actuated by respective cam lobes, such as cam lobe 143, which are part of an integral camshaft 142 housed inside the pump. Camshaft 142 is driven by the engine via any one of the various possible drive-mechanisms described above. Actuation of the pistons causes suction and resultant discharge of fuel to an accumulator 144 with both fuel suction and discharge each occurring through a separate check valve. Fuel in the accumulator is then pushed out through the check valve(s) to the conduit 116 and then to the fuel rail 114. Each pumping chamber may include a respective check valve, such as valve 146, that opens to allow pressurized fuel to enter the rail and prevent backflow of fuel from the fuel rail into the pump cylinder. In one example, the pump 108 includes four pumping chambers (and four corresponding check valves) and the engine includes 16 cylinders. Each cam may include two lobes, such that each piston is actuated twice for each full rotation of the pump drive shaft. The pump drive shaft may be driven by the crankshaft of the engine using any one of the various possible drive-mechanisms described above. In an example, one actuation of a piston of the pump may occur for each combustion event in the engine. In an example, for each rotation of the crankshaft of the engine, eight cylinders may fire and eight pump piston actuation events may occur. Other possible configurations include: (a) more than one HP pump in the system (as described below); (b) each pump being driven by the engine camshaft; (c) each pump being driven by a gear such that the pump rotates at a multiple of engine crankshaft speed, so as to match its output to engine fuel requirements based on maximum engine speed and loading and maximum allowable pump speed; and (d) the engine has 6, 8, 12, or more cylinders.

A plurality of fuel injectors 118 are in fluid communication with the common fuel rail 114. Each of the plurality of fuel injectors 118 delivers fuel to one of a plurality of engine cylinders 120 in an engine 122. Fuel is combusted in the plurality of engine cylinders 120 to provide power to the vehicle through an alternator and traction motors, for example. Operation of the plurality of fuel injectors 118 is regulated by the controller 106. In the embodiment of FIG. 1, the engine 122 includes four fuel injectors and four engine cylinders. In alternate embodiments, more or fewer fuel injectors and engine cylinders can be included in the engine.

In some implementations, the common fuel rail is a single-walled fuel rail. The CRFS also may include single-walled conduits (e.g., conduit 116 could be single-walled) for delivering fuel to the fuel rail. The single-walled configuration may be employed to reduce production costs as well as to reduce weight of the CRFS, relative to a double-walled configuration.

Fuel pumped from the fuel tank 102 to an inlet of the IMV 112 by the low-pressure fuel pump 104 may operate at what is referred to as a lower fuel pressure or supply fuel pressure. Correspondingly, components of the CRFS 100 which are upstream of the high-pressure fuel pump 108 operate in a lower fuel pressure or supply fuel pressure region. On the other hand, the high-pressure fuel pump 108 may pump fuel from the lower fuel pressure to a higher fuel pressure or rail fuel pressure. Correspondingly, components of the CRFS 100 which are downstream of the high-pressure fuel pump 108 are in a higher-fuel pressure or rail fuel pressure region of the CRFS 100. Typically, in high pressure common rail fuel systems such as the system according to the disclosure, the rail fuel pressure is very close to or slightly higher than the final fuel pressure at which the fuel is injected into each engine cylinder.

A fuel pressure in the lower fuel pressure region is measured by a pressure sensor 126 that is positioned in the conduit 110. The pressure sensor 126 sends a pressure signal to the controller 106. In an alternative application, the pressure sensor 126 is in fluid communication with an outlet of the low-pressure fuel pump 104. A fuel temperature in the lower fuel pressure region is measured by a temperature sensor 128 that is positioned in conduit 110. The temperature sensor 128 sends a temperature signal to the controller 106.

A fuel pressure in the higher fuel pressure region is measured by a pressure sensor 130 that is positioned in the conduit 116. The pressure sensor 130 sends a pressure signal to the controller 106. In an alternative application, the pressure sensor 130 is in fluid communication with an outlet of the high-pressure fuel pump 108. Note that in some applications various operating parameters may be generally determined or derived indirectly in addition to or as opposed to being measured directly.

In addition to the sensors mentioned above, the controller 106 receives various signals from a plurality of engine sensors 134 coupled to the engine 122 that may be used for assessment of fuel control health and associated engine operation. For example, the controller 106 receives sensor signals indicative of engine in-cylinder air-fuel ratio, engine speed, engine load, engine temperature, ambient temperature, fuel value, a number of cylinders actively combusting fuel, etc. In the illustrated implementation, the controller 106 is a computing device, such as microcomputer that includes a processor unit 136, non-transitory computer-readable storage medium device 138, input/output ports, memory, and a data bus. Computer-readable storage medium 138 included in the controller 106 is programmable with computer readable data representing instructions executable by the processor for performing the control routines and methods described below as well as other variants that are not specifically listed.

The controller 106 is operable to adjust various actuators in the CRFS 100 based on different operating parameters received or derived from different signals acquired from the various sensors, to dynamically assess the health of the CRFS and control operation of the engine based on the assessment. For example, in an embodiment, the controller 106 is operable to analyze output from the pressure sensor 130 in order to diagnose and indicate a degradation condition of the high-pressure fuel pump.

In some implementations, a response to the degradation condition may include shutting down the engine 122. By shutting down the engine, the likelihood of further engine degradation, degraded operability, engine damage, or the like may be reduced. In some implementations, the response to the degradation condition may include setting a diagnostic flag and presenting an indication (e.g., visual or audio) of the degradation condition to an operator. Further, certain types of degradation, such as a worn check valve of the high-pressure fuel pump, may be accounted for by adjustment of engine operating parameters (e.g., closing the IMV more than a predetermined amount for maintaining lower/decreased rail pressure, to enable engine deration) to achieve the capacity to "limp home" to the nearest service shop, thereby preventing an engine shutdown that could potentially result in an undesirable road failure of the vehicle.

Figure 2:
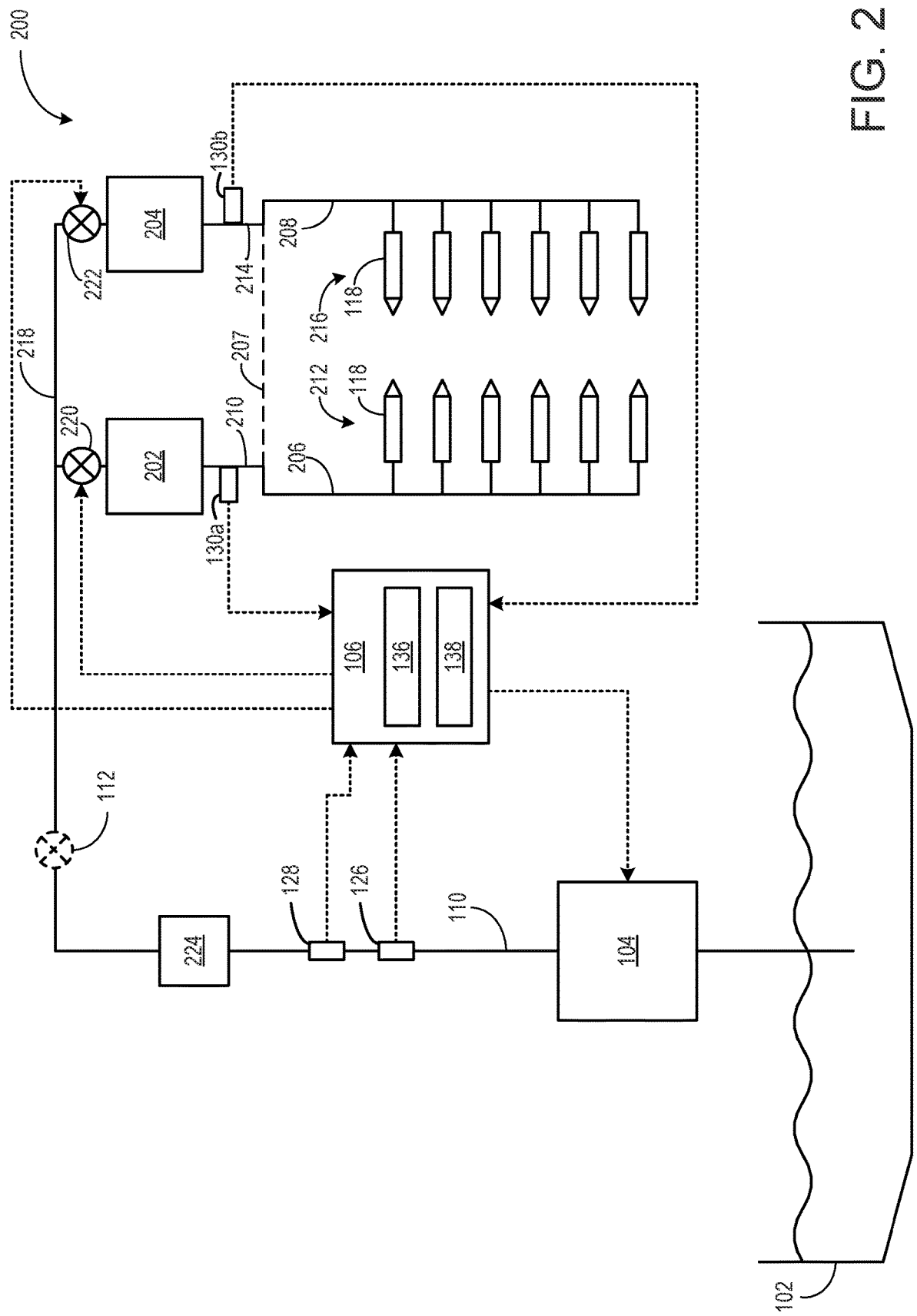
FIG. 2 schematically shows a second embodiment of a common rail fuel system of the present disclosure.

FIG. 2 shows a second example of a fuel system for an engine that includes two high-pressure fuel pumps. For example, FIG. 2 shows a block diagram of a common rail fuel system (CRFS) 200 for an engine of a vehicle having two cylinder banks (e.g., such as a V-engine), such as a rail vehicle or marine vessel, with each high-pressure fuel pump coupled to a separate cylinder bank (in one example) or coupled to each cylinder bank (in another example). The CRFS of FIG. 2 may include similar components to those described above with reference to FIG. 1. Thus, similar components have been numbered similarly and will not be re-described below. Further, CRFS 200 shown in FIG. 2 may include additional or alternative components to those shown in FIG. 2.

Liquid fuel is sourced or stored in a fuel tank 102 (e.g., fuel storage tank). A low pressure fuel pump 104 is in fluid communication with the fuel tank. In the embodiment shown in FIG. 2, the low-pressure fuel pump is disposed outside of the fuel tank and pumps fuel through a suction device or feature. Operation of the low-pressure fuel pump is regulated by a controller 106 and the controller may function as described above with reference to FIG. 1. As described above, when power to the low-pressure fuel pump is turned off, the low-pressure side of the fuel system (e.g., all fluid conduits and components upstream of a high-pressure fuel pump) does not hold fluid pressure and instead the pressure decreases below priming or operating pressure.

Liquid fuel is pumped by the low-pressure fuel pump from the fuel tank to two high-pressure fuel pumps through a low-pressure conduit 110. Specifically, the low-pressure fuel pump pumps fuel to a first high-pressure fuel pump 202 coupled to a first high-pressure fuel rail 206 and a second high-pressure fuel pump 204 coupled to a second high-pressure fuel rail 208. The first and second high-pressure fuel pumps may operate similarly to the high-pressure fuel pump 108 described above with reference to FIG. 1. For example, each of the first high-pressure fuel pump 202 and second high-pressure fuel pump 204 may be multi-piston pumps, with each piston/cylinder supplying fuel to an accumulator of the respective high-pressure fuel pump, where flow of fuel from each piston is controlled by a respective check valve. The low-pressure conduit may include a fuel filter 224. In FIG. 2, the fuel filter is shown downstream of the low-pressure fuel pump; however, in alternate embodiment, the fuel filter may be disposed in an alternate location in the low-pressure conduit.

The low-pressure fuel pump is decoupled from the drives of the first and second high-pressure fuel pumps such that the pumps may operate independently from one another (e.g., power to the low-pressure fuel pump may be shut off while the first and second high-pressure fuel pumps continue to operate). In an alternate embodiment, the low-pressure fuel pump may be mechanically driven by one or both of the high-pressure pumps and thus the low-pressure fuel pump may not operate independently from the high-pressure fuel pump(s). As shown in FIG. 2, a first inlet metering valve 220 is coupled upstream of the first high-pressure fuel pump and a second inlet metering valve 222 is coupled upstream of the second high-pressure fuel pump. Thus, the low pressure conduit couples to a second low pressure conduit 218 extending between an inlet to the first inlet metering valve and an inlet to the second inlet metering valve. The first and second inlet metering valves are configured to adjust a flow rate of fuel that is provided to the first and second high-pressure fuel pumps, respectively, and further to the first and second high pressure fuel rails, respectively, for distribution to a plurality of fuel injectors 118 for fuel injection.

In an alternate embodiment, a single inlet metering valve 112 may be disposed in the low-pressure conduit upstream of both the first and second high-pressure fuel pumps to adjust a flow rate of fuel that is provided to the first and second high-pressure fuel pumps and further to the first and second high pressure fuel rails for distribution to a plurality of fuel injectors 118 for fuel injection into a plurality of engine cylinders. In another embodiment, the CRFS may not include an IMV, and fuel pressure delivered to the injectors may instead be controlled on the high-pressure side of the system (e.g., downstream from each of the first and second high pressure fuel pumps).

The high-pressure fuel pumps increase fuel pressure from a lower pressure to a higher pressure. The first high-pressure fuel pump delivers fuel to the first high pressure fuel rail through a high-pressure conduit 210. A first set of fuel injectors 212 for a first bank of the engine are in fluid communication with the first high pressure fuel rail. Each of the first set of fuel injectors delivers fuel to one of a plurality of engine cylinders of a first bank of the engine (similar to the engine of FIG. 1). Operation of the first set of fuel injectors is regulated by the controller. In the embodiment of FIG. 2, the engine includes six fuel injectors and six engine cylinders on each engine bank. In alternate embodiments, more or fewer fuel injectors and engine cylinders can be included in the complete engine, or in each bank of the engine.

Similarly, the second high-pressure fuel pump delivers fuel to the second high-pressure fuel rail through a high-pressure conduit 214. A second set of fuel injectors 216 for a second bank of the engine are in fluid communication with the second high-pressure fuel rail. Each of the second set of fuel injectors delivers fuel to one of a plurality of engine cylinders of a second bank of the engine. Operation of the second set of fuel injectors is regulated by the controller 106.

In some examples, the first high-pressure fuel rail may be fluidly coupled to the second high-pressure fuel rail via a conduit 207. In this way, fuel to all cylinders may be provided by a single high-pressure fuel rail. However, in some examples, conduit 207 may be dispensed with. Further, while not shown in FIG. 2, a valve may be positioned in conduit 207 in order to regulate fluid communication between the two the high-pressure fuel rails.

A respective pressure sensor is positioned downstream of each high-pressure fuel pump. As shown, a first pressure sensor 130a is positioned in high pressure conduit 210 and a second pressure sensor 130b is positioned in high pressure conduit 214. Each of the pressure sensors may be high-precision, fast-response sensors that measure pressure with a response rate of less than or equal to 0.5 msec, and/or at a rate of 2,000 times engine crank speed, for example. While FIGS. 1 and 2 show the respective pressure sensors being positioned outside of the corresponding fuel pumps in a high pressure conduit, in some examples, each pressure sensor may be coupled to an outlet/high pressure conduit within the high-pressure fuel pump assembly.

Excess fuel in the fuel injectors returns to the fuel tank via a common fuel return (not shown). As such, the common fuel return is coupled to the fuel tank. In other embodiments, the CRFS may not include a common fuel return. In another embodiment, return fuel is fed back to upstream of the IMV. In yet another embodiment, return fuel is fed back to the inlet of the low-pressure fuel pump.

In one example, each of first pump 202 and second pump 204 includes four pumping chambers (and four corresponding check valves) and the engine includes 16 cylinders. Each cam of each pump may include two lobes, such that each piston of each pump is actuated twice for each full rotation of the pump drive shaft. The pump drive shaft may be driven by the crankshaft of the engine. In an example, one actuation of a piston of the pump may occur for each combustion event in the engine. In an example, for a sixteen-cylinder engine, for each rotation of the crankshaft of the engine, eight cylinders may fire and eight pump piston actuation events may occur for each pump. In yet another example, the pump cam may include three or more lobes in order to meet the fueling (pressure and quantity) requirements of the engine.

In a multi-piston high-pressure fuel pump (such as the pumps described herein with respect to FIGS. 1 and 2), whether configured radially, axially, or in-line, fuel is pumped by discrete piston movements. Each piston goes through a suction phase and a pumping phase during its individual pumping event and the frequency of these pumping events depends (in the case of an in-line or radial pump) on the number of cam lobes acting on each piston per pump shaft revolution and on the speed of the pump shaft drive, or in the case of a swashplate design, solely on the speed of the pump shaft drive. Although all of the pistons generally flow into a common plenum (e.g., accumulator), it is possible to discern the individual pressure pulses resulting from the individual piston pumping events through the use of a highly-sensitive, high-resolution, high-accuracy, highly-repeatable rail pressure sensor, which is included to provide feedback and control rail pressure.

There are several high-pressure fuel pump degradation mechanisms which can limit the ability of an engine to reach full power, can result in defaulting to a limp home mode, can cause a mission failure, or can be misinterpreted by control/safety algorithms as a fuel leak. These include leakage past a worn plunger/sleeve, poor check valve sealing due to contamination, cavitation, metallurgical breakdown, corrosion, and one or more degraded or worn cam lobes. Typically, these modes are not recognized until the operation of the engine has degraded significantly.

According to embodiments disclosed herein, analysis of the output of the rail pressure sensor may be utilized to determine if an individual piston is beginning to pump less than the others in the pump, which could be an indication of poor check valve sealing, excessive plunger leakage, degraded/worn cam lobe(s), or sluggish behavior associated with check valve sticking. For example, individual pressure pulses detected by the rail pressure sensor may be evaluated and/or the frequency content of the output of the rail pressure sensor may be evaluated to determine the health of the high-pressure fuel pump. This may be accomplished by comparing the sizes of the individual pressure pulses (magnitude and duration) with stored initial/pre-set values and/or with each other under the same engine operating conditions (speed, load, temperature). This analysis can be used to alert the operator that the high-pressure fuel pump is beginning to degrade, so that the pump (or individual internal components of the pump) may be replaced before causing a road failure. In addition, by indicating that the pump is beginning to degrade, the number of times the control valve (e.g., IMV) is changed due to leak detection faults that are not attributable to IMV wear/malfunction may be reduced. Often, the first response to such a fault code is to replace the control valve, assuming that it is the culprit. However, pump flow reduction can also cause the same type of fault. Knowing which one is the root cause can eliminate extra work, extra service time in the repair shop, material usage, and unnecessary/wasteful repair costs.

The disclosure relies on use of an existing pressure sensor for early detection of an impending pump degradation. By comparing the width and magnitude of individual pressure pulses measured in the pump accumulator with initial (as new) values and with each other, or by comparing the relative magnitudes of each of two or more frequency components of the output from the pressure sensor, it is possible to identify a weak or degrading pump cylinder, including its check valve, plunger/piston, and even cam lobe. In doing so, the number of inlet metering valve replacements may be reduced, imminent pump degradation may be determined and/or the degradation/performance status of the pump may be tracked over time, without requiring additional hardware expense. Additionally, the pressure pulsation analysis may be used in conjunction with leak detection algorithm to reduce nuisance faults.

Figure 3:
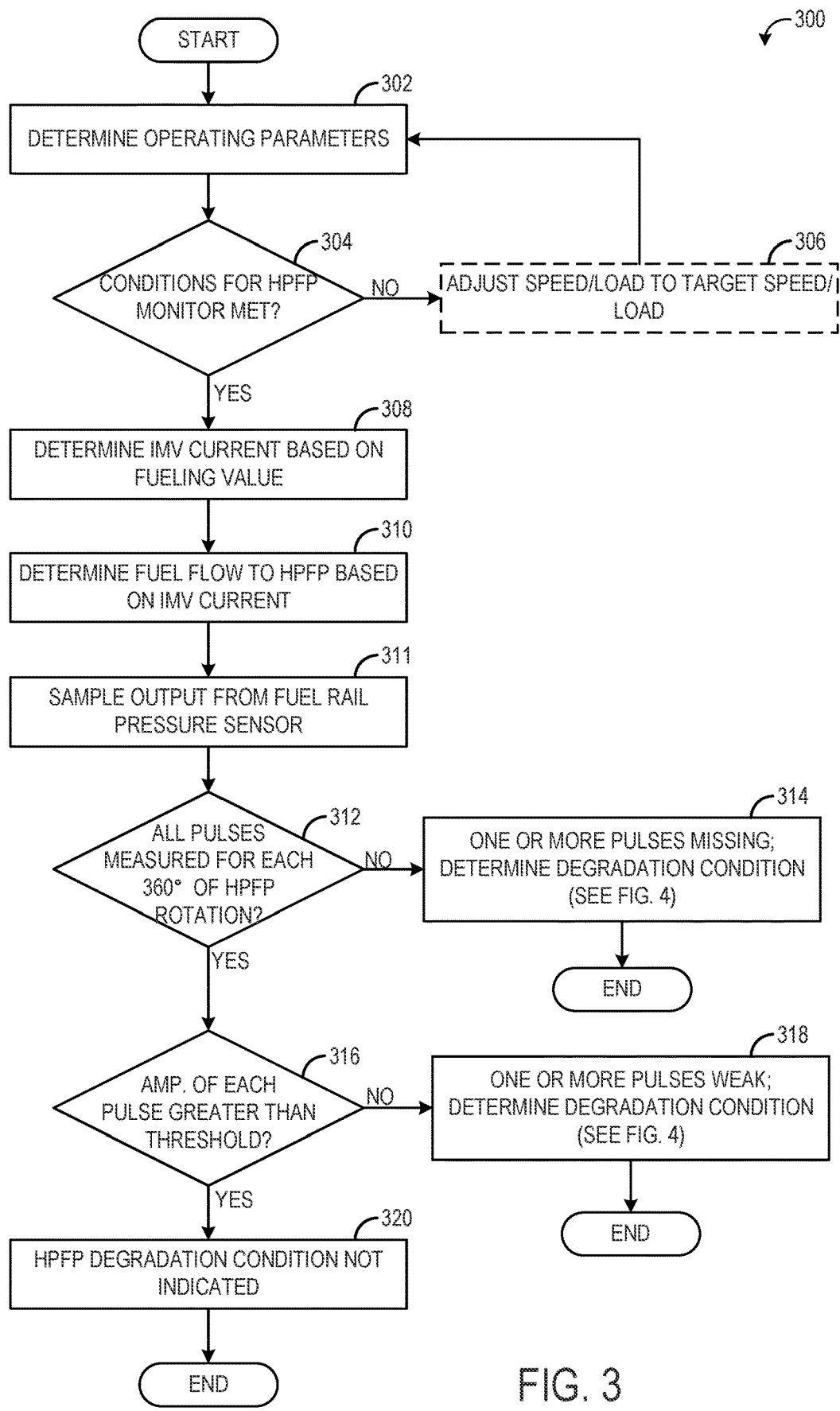
FIG. 3 is a flow chart illustrating an example method for diagnosing a high-pressure fuel pump.

Thus, FIG. 3 is a flow chart illustrating a method 300 for tracking a degradation condition of a high-pressure fuel pump. Instructions for carrying out method 300 and the rest of the methods included herein may be executed by a computing system (such as the controller 106 shown by FIG. 1 and/or a remote computing system in communication with the controller) based on instructions stored on a memory of the computing system and in conjunction with signals received from a control unit and sensors of the engine system, such as the sensors (e.g., rail pressure sensor 130 or rail pressure sensors 130a, 130b) described above with reference to FIGS. 1 and 2. The computer system may employ certain actuators that are part of the engine system (e.g., such as the fuel injectors or the like) to adjust engine operation, according to the methods described below. Method 300 may be performed in a vehicle system that includes only one high-pressure fuel pump, such as the system illustrated in FIG. 1. In other examples, method 300 may be performed in a vehicle system that includes more than one high-pressure fuel pump, such as the system illustrated in FIG. 2.

At 302, method 300 includes determining operating parameters. The determined operating parameters may include, but are not limited to, engine speed, engine load, commanded and/or measured IMV position, fuel injection amount, fuel rail pressure, fuel rail temperature, and other parameters. At 304, method 300 determines if conditions for initiating a high-pressure fuel pump (also referred to as an HPFP) monitor are met. The conditions may include engine speed and/or load being within a target range of engine speeds/loads (e.g., engine speed greater than a first threshold but less than a second threshold, such as greater than 250 RPM and less than 2000 RPM), engine speed/load changing by less than a threshold amount, fuel rail temperature in a target range, and/or other conditions. If the conditions for monitoring the HPFP are not met, method 300 optionally proceeds to 306 to adjust engine speed and/or load to reach the target speed/load. For example, if the HPFP monitor has not been executed for a threshold amount of time, or if other diagnostic tests (such as leak tests) indicate a potential HPFP degradation condition, the engine may be commanded to operate with the target speed/load so that monitoring of the HPFP condition may be carried out. In other examples, when conditions for monitoring the HPFP are not met, method 300 loops back to 302 to continue determining operating conditions until the HPFP monitor conditions are met.

During typical engine operation (e.g., when the HPFP monitor is not being carried out), the rail pressure sensor output is monitored continuously at a high frequency or sampling rate, but the dynamic pulses are averaged to provide a steady-state rail pressure (e.g., 2200 bar). The steady-state rail pressure is fed back to the controller so that it can be compared with the desired average rail pressure at current engine operating conditions (various temperatures, notch [a combination of rpm and load], altitude, etc.). The controller uses this information to determine if the IMV signal is to be changed to increase or decrease the opening of the IMV so that rail pressure reaches an instantaneous target pressure. IMV current (% duty cycle) is also constantly monitored so that it can be compared to expected commands under those engine operating conditions, and that comparison is used by a leak detection algorithm (described below) to determine if the HPFP is delivering more fuel than the engine is using, thus indicating a leak.

In the example case of a locomotive engine, the most common operating conditions are at idle and at Notch 8 (maximum speed and load), and thus these two conditions represent the majority of time when fuel rail pressure and IMV current are measured. If the data collection frequency is a fixed time, rather than crank degrees, then more data points will be taken at lower engine speeds (e.g., idle) per engine revolution, resulting in a cleaner fuel-rail-pressure signal.

If the HPFP monitor conditions are met, method 300 proceeds to execute the HPFP monitor, while operating with the HPFP monitor conditions. Executing the HPFP monitor includes, at 308, determining IMV current based on a fueling value. The fueling value may be a commanded fuel injection amount for each cylinder of the engine, based on current engine speed and engine load, for example, and may be determined from a look-up table that utilizes engine speed and load as inputs and fuel injection amount as an output, or may be determined by accessing stored fuel injection commands. The fuel injection amount for each cylinder may be used to determine how much current to supply to the IMV in order for the IMV to be at a position that will provide a fuel flow to the HPFP to reach the commanded fuel rail pressure. The IMV supply current may be determined via a look-up table stored in memory of the controller that utilizes the fueling value and/or other parameters (e.g., the commanded fuel injection amount and engine speed) as an input and outputs the IMV supply current. The rail pressure may be maintained at the commanded fuel rail pressure so that the fuel injection quantities, which are determined by injection duration commands from the controller, precisely match the engine's instantaneous requirements.

At 310, method 300 includes determining fuel flow to the HPFP based on the IMV current. The IMV current value that is supplied to the IMV causes the IMV to be in a given position, and the fuel flow to the HPFP may be determined from the given position of the IMV. For example, the controller may have a table stored in memory that includes the IMV position as a function of the supply current to the IMV, and based on parameters of the low-pressure pump (which may result in knowledge of the flow rate of the fuel from the low-pressure pump to the IMV), the controller may determine the fuel flow to the HPFP. If the vehicle system includes two IMVs, the current value to each IMV may be determined and a separate fuel flow to each HPFP may be determined.

In one example, the rail pressure sensor outputs are monitored, and a single duty cycle/current command is used to control both IMVs. By doing so, it may be possible to determine if the two HPFPs are not achieving the same rail pressures, and the rail pressures may be used as a diagnostic tool. However, in some examples, the IMVs, and thus the rail pressures, may be controlled separately. This may ensure that both banks of the engine are operating the same, and the difference in IMV commands may also be used as a diagnostic technique. However, these measurements are fairly gross in nature, and may not reliably provide enough lead time for operators to react and apply corrective actions before total road degradation (e.g., shutdowns) occur. The routine described herein does provide sufficient warning. For example, an HPFP may have degraded check valves without causing the average rail pressure of the HPFP, or its IMV current, to vary enough to exceed the normal expected ranges due to piece-to-piece variations of components and sub-systems. In those cases, faults are not logged until more degradation occurs. The advantage of routine described herein is that it compares the HPFP to itself (or to the HPFP's most-recent-past operation metrics), almost in real time, and provides a warning long before the cruder diagnostics can detect anything.

At 311, method 300 includes sampling the output from the fuel rail pressure sensor (or from each fuel rail pressure sensor if the vehicle system includes two HPFPs). During execution of the HPFP monitor, the fuel rail pressure sensor output may be sampled for a suitable duration, such as one engine cycle, multiple engine cycles, etc. The sampled output may be plotted as a function of time and/or processed in a suitable manner to generate a smoothed plot of fuel rail pressure over time.

Figure 5:
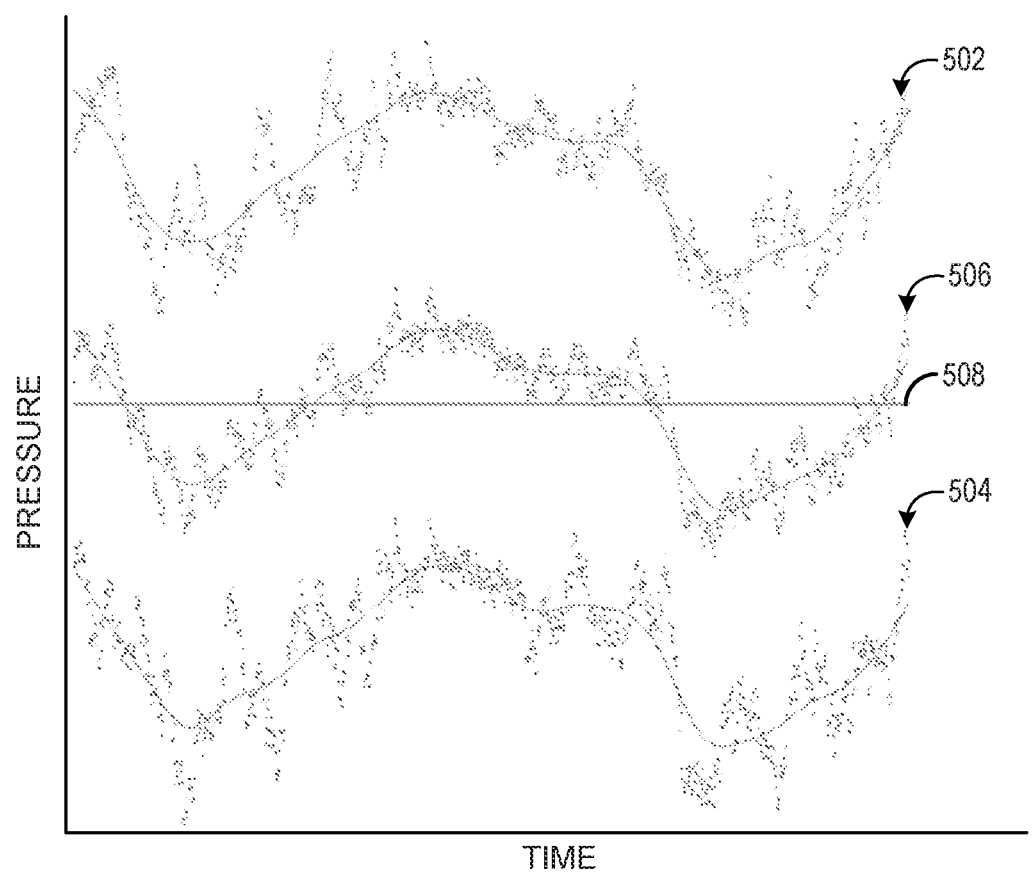
FIG. 5 is a graph illustrating an example of raw data output from a fuel rail pressure sensor, along with smoothed average curves fit to the data.

FIG. 5 shows an example of raw fuel rail pressure sensor output for a first pressure sensor positioned to measure fuel pressure produced from a first high-pressure fuel pump (plot 502) and a second pressure sensor positioned to measure fuel pressure produced from a second high-pressure fuel pump (plot 504). An additional plot (plot 506) shows average pressure as well as a pressure setpoint (line 508). In the example shown in FIG. 5, each pump has its own IMV. A common control current is sent to both IMVs, and the variations seen in FIG. 5 may be the result of piece-to-piece pressure and temperature sensor, IMV, and HPFP variations. If the side-to-side bank-to-bank average pressures are too far apart, but still within tolerance, the operator may be notified to perform existing service diagnostic procedures at the next opportunity in order to detect/identify the root cause for such discrepancy in bank-to-bank average pressures.

Figure 6:
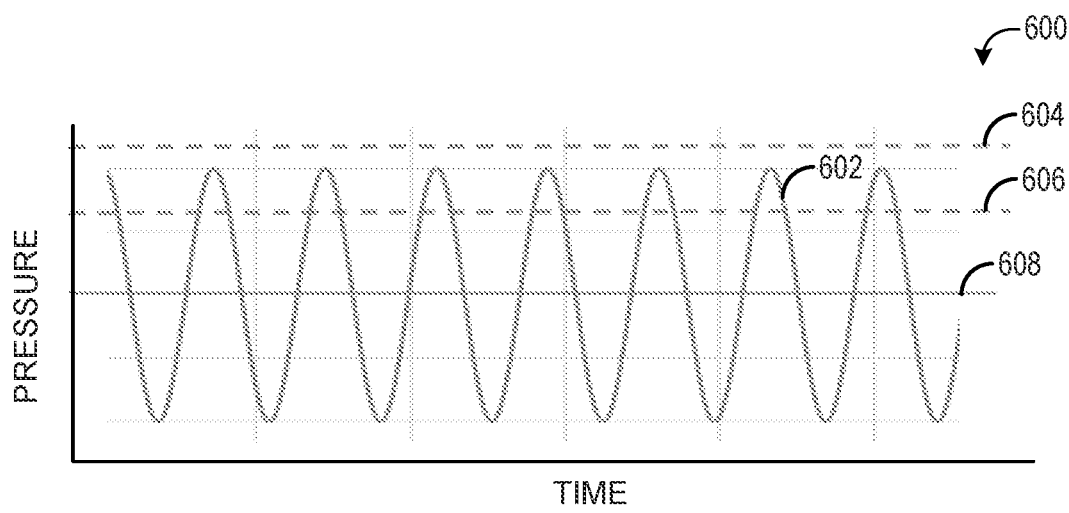
FIG. 6 is a graph illustrating an example of a normalized processed pressure signal generated from output from a fuel rail pressure sensor associated with a healthy high-pressure fuel pump.

FIG. 6 shows a graph 600 of processed pressure sensor data for a healthy pump, such as processed data from the output of one of the pressure sensors illustrated in FIG. 5. Line 602 shows smoothed dynamic pressure normalized to pump average (where the pump average is shown by line 608). Each peak of line 602 corresponds to an actuation or pumping event of a given piston of a given pumping chamber of the pump, as each actuation event results in a pressure pulse in the accumulator. Also shown in FIG. 6 are an upper limit 604 and a lower limit 606 based on the current operating point (e.g., engine speed and load). When the pump is healthy, the magnitude of each peak of the plotted signal falls within the lower limit and the upper limit.

The upper and lower limits may be determined by statistical analysis of the running average starting from the very first time the HPFP was run/operated on the engine/vehicle (e.g. continually drop off the oldest reading and add the newest), and re-average, for example, the last 200 or so points; then a calculation of mean peak pressure minus 3σ (three times the standard deviation of the two hundred or so points) may be performed to determine the lower limit. If one cylinder out of four in the pump begins to drop off, the average will not fall as quickly as that one element. However, as the pump continues to operate, the pressure output of the degrading cylinder will eventually fall below the lower limit. The upper limit can be determined based on the average peak pressure values plus 3σ. If the average begins to increase, it may indicate that there is a control issue rather than a pump hardware issue (e.g., the system is being commanded to a higher fuel pressure level).

Figure 7:
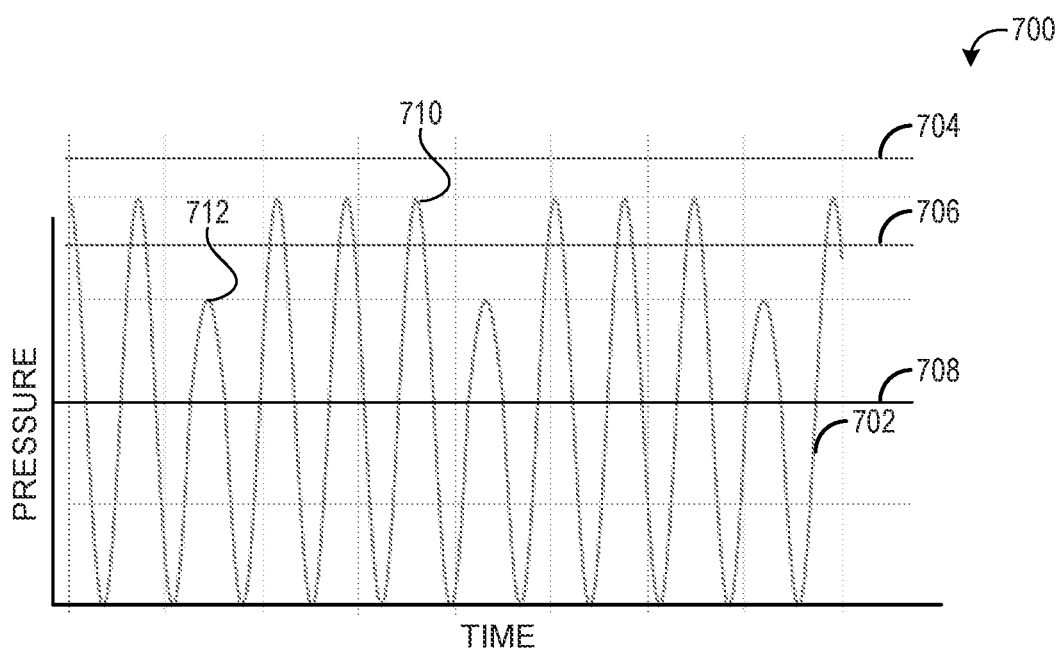
FIG. 7 is a graph illustrating an example of a normalized, smoothed, and processed pressure signal generated from output from a fuel rail pressure sensor associated with a high-pressure fuel pump exhibiting a first level of degradation.

In contrast, FIG. 7 shows a graph 700 of a pressure signal indicative of a degraded pump with a first level of degradation. Similar to graph 600 of FIG. 6, graph 700 includes a line 702 representative of a smoothed dynamic pressure normalized to pump average (where the pump average is shown by line 708). Each peak of line 702 corresponds to an actuation event of a given piston of the pump, as the actuation event results in a pressure pulse in the accumulator. Also shown in FIG. 7 are an upper limit 704 and a lower limit 706 based on the current operating point (e.g., engine speed and load).

A plurality of the peaks of line 702 have a magnitude that is within the upper limit and the lower limit, such as peak 710. However, three of the peaks (e.g., peak 712) have a magnitude that is below the lower limit. As explained previously, the example high-pressure pump of which the pressure data is measured includes four pistons and each piston is actuated twice during a rotation of the pump drive shaft. As such, each rotation of the pump shaft results in eight pressure pulsations. For every four actuation events, one pressure pulsation has a magnitude below the lower limit, indicating that one piston is not producing as much pressure as the remaining pistons of the pump.

Figure 8:
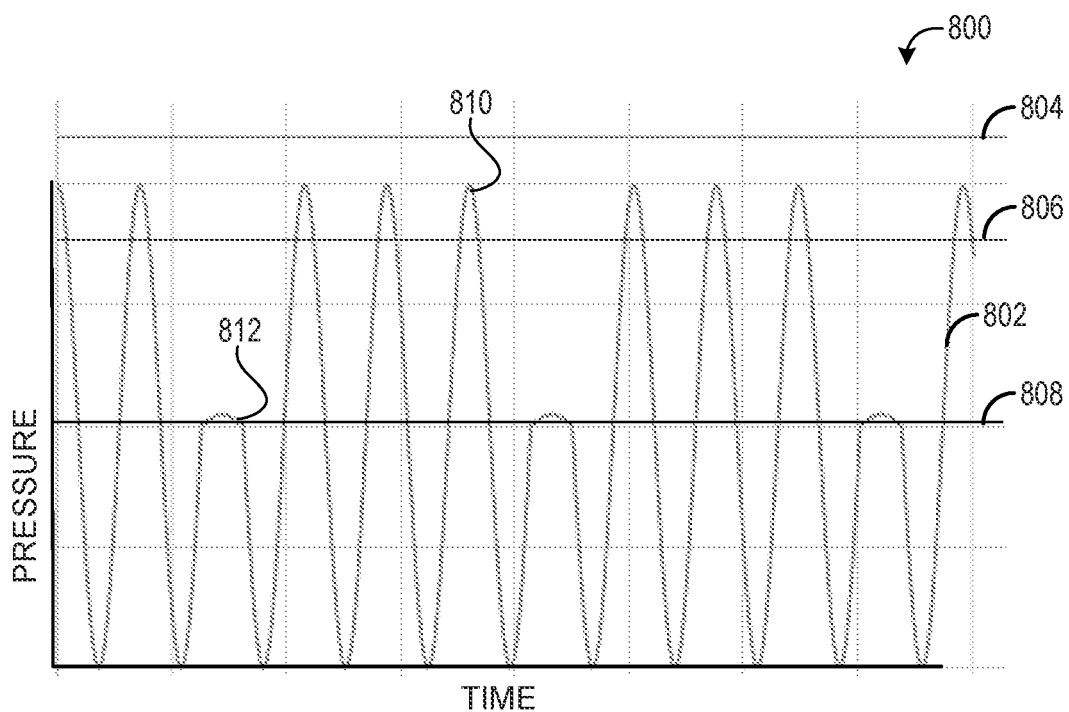
FIG. 8 is a graph illustrating an example of a normalized, smoothed, and processed pressure signal generated from output from a fuel rail pressure sensor associated with a high-pressure fuel pump exhibiting a second level of degradation.

Similarly, FIG. 8 shows a graph 800 of a pressure signal indicative of a degraded pump with a second level of degradation. Similar to graph 600 of FIG. 6, graph 800 includes a line 802 representative of a smoothed dynamic pressure normalized to pump average (where the pump average is shown by line 808). Each peak of line 802 corresponds to an actuation event of a given piston of the pump, as the actuation event results in a pressure pulse in the accumulator. Also shown in FIG. 8 are an upper limit 804 and a lower limit 806 based on the current operating point (e.g., engine speed and load).

A plurality of the peaks of line 802 have a magnitude that is within the upper limit and the lower limit, such as peak 810. However, three of the peaks (e.g., peak 812) have a magnitude that is below the lower limit. As explained previously, each rotation of the pump shaft results in eight pressure pulsations. As two of the eight pressure pulsations have a magnitude below the lower limit, it indicates one piston is not producing as much pressure as the remaining three pistons of the four piston pump. Further, the magnitude of peak 812 is less than the magnitude of peak 712. As such, the level of degradation of the pump detected by the pressure signal plotted in FIG. 8 may be greater than the level of degradation of the pump detected by the pressure signal plotted in FIG. 7.

Returning to FIG. 3, at 312, method 300 determines if all expected pressure pulses for each 360° of pump rotation are detected/measured. As explained previously, each time an actuation event of a piston of the HPFP occurs (e.g., each time a cam of the camshaft pushes a corresponding piston upward), a small amount of fuel is pushed into the accumulator of the HPFP and out to the fuel rail, causing a temporary increase in pressure in the fuel rail/conduit leading to the rail, which is detectable by the high-precision, fast-responding fuel rail pressure sensor. Based on the number of pistons in the pump and the configuration of the cams, a total number of pressure pulses expected to be produced during one rotation of the pump may be determined. For example, in a pump with four pistons/cams where each cam has two lobes, eight pulses are expected to be produced during each full rotation of the pump camshaft. In some examples, a pressure pulse may be determined to be "missing" (e.g., not detected) if the magnitude of the peak corresponding to that pressure pulse is less than a first threshold, even if the pressure pulse still has a measurable magnitude. For example, the magnitude of peak 812 of FIG. 8 may be considered undetectable, as it is almost or nearly equal to the average (or zero) pressure with the peak completely missing.

If all expected pulses are not detectable (e.g., at least one pulse is not detectable), method 300 proceeds to 314 to indicate that one or more pulses are missing (also referred to as one or more pumping chambers of the HPFP being non-functional) and subsequently determine the degradation condition of the pump, which will be explained in more detail below with respect to FIG. 4. Thus, at least in one example, the controller may determine that the HPFP is operating with one or more undetectable pump pressure pulses. The controller may determine the HPFP is operating with the one or more undetectable pump pressure pulses by analyzing output sampled from the fuel rail pressure sensor over at least a rotation of the pump cam/drive shaft and identifying a plurality of magnitudes of peaks in the output, where each peak is indicative of a pumping action of an individual cylinder-plunger in the HPFP. If the number of identified peak magnitudes is less than expected and/or if one or more magnitudes is less than a first threshold, the controller determines the HPFP is operating with one or more undetectable pump pressure pulses.

If all pulses are detected, method 300 proceeds to 316 to determine if the magnitude (also referred to as the amplitude) of each pulse is greater than a second threshold magnitude/amplitude. The second threshold may be the lower limit pressure described above with respect to FIGS. 5-8 and may be greater than the first threshold. If the answer is no, method 300 proceeds to 318 to indicate that one or more pulses are weak (also referred to as one or more pumping chambers of the HPFP being weakly functional) and subsequently determine the pump degradation condition, which will be explained in more detail below with respect to FIG. 4. Thus, at least in one example, the controller may determine that the HPFP is operating with one or more weak pump pressure pulses. The controller may determine the HPFP is operating with the one or more weak pump pressure pulses by analyzing output sampled from the fuel rail pressure sensor over at least one full rotation of the pump cam/drive shaft and identifying a plurality of magnitudes of peaks in the output, where each peak is indicative of a pumping action of the HPFP. If one or more magnitudes is less than a second threshold, the controller determines the HPFP is operating with one or more weak pump pressure pulses.

If the answer is yes (e.g., each pulse magnitude is greater than the second threshold), method 300 proceeds to 320 to indicate that no degradation is identified (e.g., the pump is healthy). Thus, the controller determines that the HPFP is operating with no weak or undetectable pump pressure pulses and hence the HPFP is operating in an un-degraded state with all pressure pulses detectable (e.g., above the second threshold). Upon indicating that the pump is not degraded, standard/current operating parameters may be maintained, such as maintaining commanded fuel injection amounts and IMV position.

Figure 4:
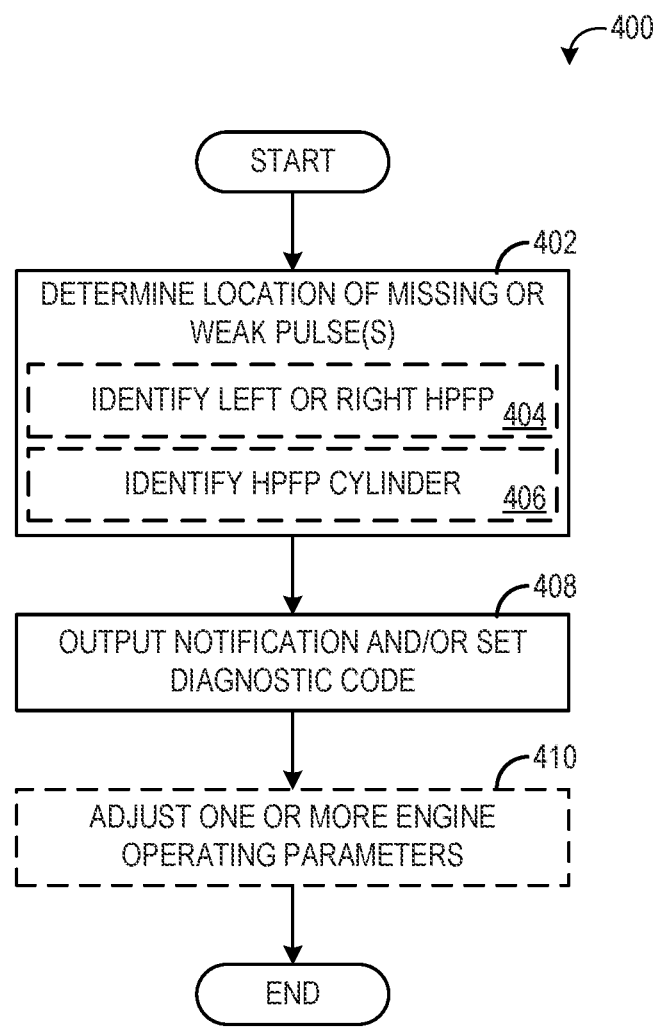
FIG. 4 is a flow chart illustrating an example method for determining a degradation condition of a high-pressure fuel pump.

FIG. 4 is a method 400 for determining a pump degradation condition. Method 400 may be carried out in response to an indication that one more pumping chambers of a high-pressure fuel pump are degraded, for example in response to an indication that one or more pressure pulses of a pressure signal output by a fuel rail pressure sensor is missing (e.g., as determined at 314 of method 300 of FIG. 3) or weak (e.g., as determined at 318 of method 300 of FIG. 3).

At 402, method 400 includes determining the location of the weak or missing pulse(s). Determining the location of the weak or missing pulse(s) may include identifying if the weak or missing pulse(s) are associated with a first (e.g., left engine bank) or second (e.g., right engine bank) pump, as indicated at 404. Identifying the degraded pump may be performed in systems that include more than one high-pressure pump, and may include identifying the pressure sensor that generated the signal indicating the degraded pump (e.g., whether the signal was generated from a sensor positioned downstream of the first pump or downstream of the second pump).

Determining the location of the weak or missing pulse(s) may additionally or alternatively include identifying the pumping chamber of the degraded pump that is generating the weak or missing pulse, as indicated at 406. To identify the actual pumping chamber that is degraded, the pressure signal may be correlated with engine position and a known relationship between the pump drive shaft position or pump camshaft position and the engine crankshaft position. For example, the controller may obtain a relationship between engine position and HPFP piston actuation from a look-up table or other suitable data structure stored in memory of the controller. The relationship may specify the engine position (e.g., in degrees crank angle) at which one or more pistons of the HPFP is actuated, for example. When the output from the fuel rail pressure sensor is sampled, the output may be associated with engine position data (e.g., from an engine position sensor) such that each peak of the processed pressure signal may be associated with an engine position, and then based on the relationship between the engine position and piston actuation event, the pumping chamber associated with each peak may be identified. Other mechanisms for determining the relationship between pump camshaft (or pump drive shaft) orientation and engine crankshaft orientation are possible, such as a position sensor on the pump camshaft or the pump drive shaft.

At 408, method 400 includes outputting a notification of the pump degradation condition and/or setting a diagnostic code. The notification and/or diagnostic code may include an indication of the level of degradation of the HPFP. For example, if during the execution of method 300 of FIG. 3, it is determined that the HPFP is operating with one or more weak pump pressure pulses, the controller determines that the HPFP is operating with a slightly degraded pump chamber. The controller may determine that the pressure signal includes one or more weak pressure pulses (e.g., where one or more low peaks are detectable but are not below the minimum threshold for a healthy pump), and in response, output the notification and/or diagnostic code that may include an indication that HPFP degradation indicating a service intervention is likely to occur in the relatively near future (e.g., next operational period, within a threshold number of engine cycles or miles/kilometers the vehicle is operated, etc.).

On the other hand, if during the execution of method 300 of FIG. 3, it is determined that the HPFP is operating with one or more missing or undetectable pump pressure pulses, the controller may determine that the HPFP is operating with one or more fully degraded pump chamber(s). The controller may determine that the pressure signal indicates one or more missing pressure pulses (e.g., where one or more peaks are not detectable), and in response output the notification and/or diagnostic code that may include an indication that HPFP degradation is already occurring. Further, the notification and/or diagnostic code may include identification of which HPFP is exhibiting the degradation condition and/or which cylinder of the HPFP is exhibiting the degradation, in order to expedite the service of the HPFP when the next regular maintenance service is carried out.

At 410, method 400 optionally includes adjusting one or more operating parameters responsive to the HPFP degradation condition. The one or more operating parameters that may be adjusted include IMV position, commanded fuel injection amounts, fuel injection timing, and commanded engine speed and/or load. For example, when an HPFP is indicated as being degraded, engine power may be reduced, in order to reduce the commanded fuel injection amounts and hence the fuel flow into and out of the HPFP. Thus, at least in one example, the controller may determine that the HPFP is operating with a weak or fully degraded pumping chamber and in response, the controller may adjust a commanded IMV plunger position to admit additional fuel to the fuel rail in order to maintain the commanded engine speed and power output, for example, and/or the controller may adjust fuel injection parameters to derate the engine.

When HPFP degradation occurs, normal pressure feedback control may compensate for a while by opening the IMVs to achieve the desired rail pressure. However, it may be desirable to reduce power in order to continue operating until the degraded pump can be serviced/replaced. Once a check valve or plunger element has begun to degrade, the pump will eventually degrade. However, with the routine described herein, it may be possible to predict how much longer the pump will continue to operate once degradation has begun, for example, by continuously monitoring the change in rail pressure pulses over time. Additionally, a special "limp-home" operating mode may be executed to provide more margin, and to enable the vehicle to travel to the nearest service facility. The limp-home operating mode may include first determining that the HPFP is operating with a degraded pumping chamber, and then while the HPFP is operating with the degraded pumping chamber, reducing fuel injection amounts, or taking other actions, to force the engine to operate at a lighter load with less fuel, for example. While such a mode may slow vehicle travel, the reduced fueling demand of the limp-home mode may allow the HPFP to meet a revised (lower) commanded rail pressure, reduce the pumping output of the HPFP, and/or other parameters, such that the vehicle may be operated until the vehicle is in a location to be serviced. Method 400 then returns. Finally, once a weak pump element has been identified, the calibration of the leak detection algorithm may be altered to prevent nuisance fault codes.

Figure 9:
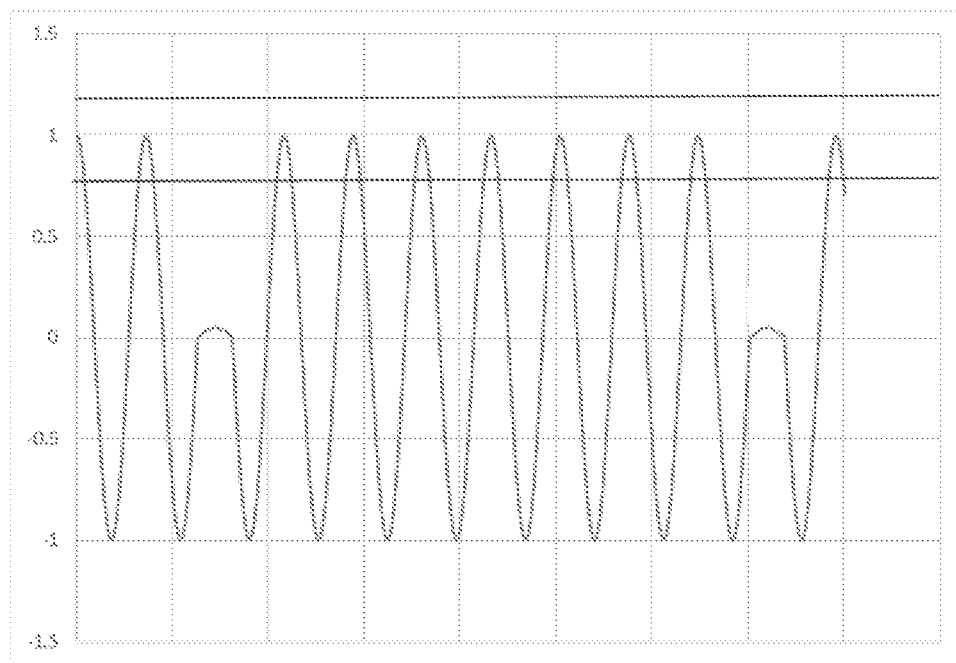
FIGS. 9 and 10 are graphs illustrating example processed pressure signals generated from output from a fuel rail pressure sensor associated with a high-pressure fuel pump having a single degraded cam lobe.
Figure 10:
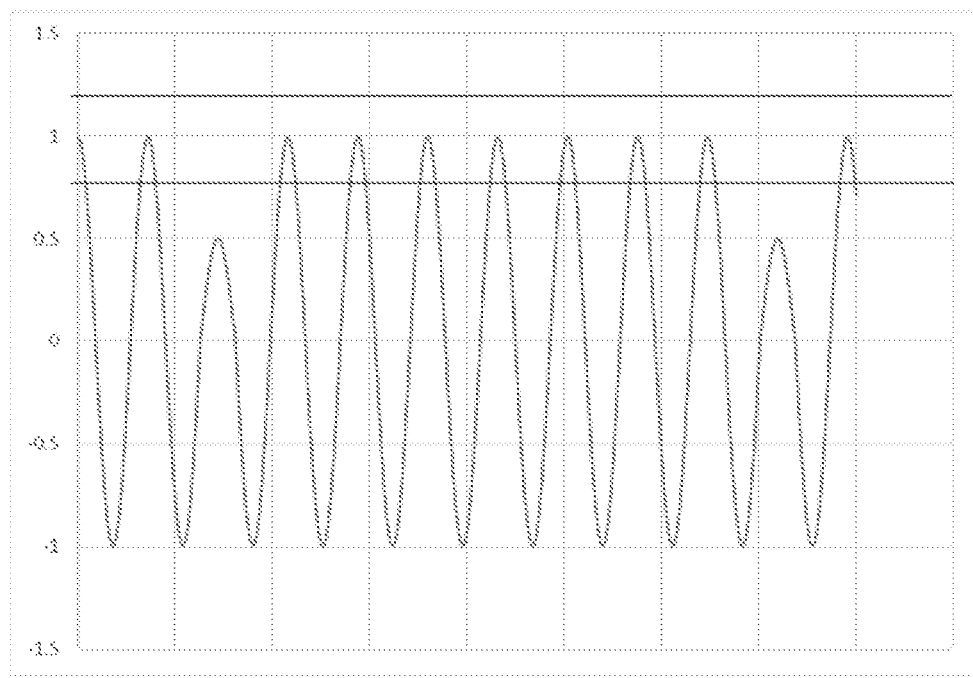

Thus, according to the systems and methods provided herein, high-pressure fuel pump (HPFP) degradation due to a degraded check valve or other internal pump component may be identified via analysis of the pressure pulsations measured by the fuel rail pressure sensor. In doing so, current or future high-pressure pump degradation may be identified without utilizing additional hardware, such as pump drive shaft torque sensors or flow meters. While the methods herein were described with respect to identifying check valve degradation of a high-pressure fuel pump, other types of degradation may also be identified using the methods according to the disclosure. For example, a degraded HPFP cam lobe may be identified based on the pressure pulsation signal generated from the output of the fuel rail pressure signal. A degraded cam lobe of the fuel pump may be differentiated from a degraded check valve due to the degraded cam lobe only affecting one pumping event out of the two pumping events for a given pumping chamber. In the graph 800 illustrated in FIG. 8, for example, two peaks are shown as having magnitudes less than the threshold for indicating degradation. If degradation were due to a faulty cam lobe, on the other hand, only one peak per rotation of the pump drive shaft would exhibit a reduced pressure pulse (e.g., one peak per eight peaks for a four piston pump). For example, FIG. 9 shows an example plot of pressure pulses that may be observed when one cam lobe is worn off and FIG. 10 shows an example plot of pressure pulses that may be observed when one cam lobe is partially worn off.

Further, high-pressure pump degradation due to check valve degradation may be differentiated from IMV degradation, avoiding unnecessary replacement of the IMV and preventing persistent high-pressure pump degradation that may lead to engine degradation and potential road failure. In one example, IMV degradation may be identified via another diagnostic routine that may be performed either separately or concurrently with the HPFP monitor described herein. An example routine for detecting IMV degradation may include ramping up or ramping down the current supplied to the IMV until a target fuel rail pressure is reached. If the rail does not reach the target rail pressure, degradation of the IMV may be indicated. Further, if the rail does reach the target pressure, the current at which the target rail pressure is reached may be determined and compared to an expected or predefined current. If the current differs from the expected or predefined current by more than a threshold, degradation of the IMV may be indicated. In some examples, if during the execution of the IMV diagnostic routine it is determined the IMV is degraded, the HPFP monitor may be executed to confirm the degradation is due to a degraded IMV and not due to a degraded pumping chamber of the HPFP.

Figure 11:
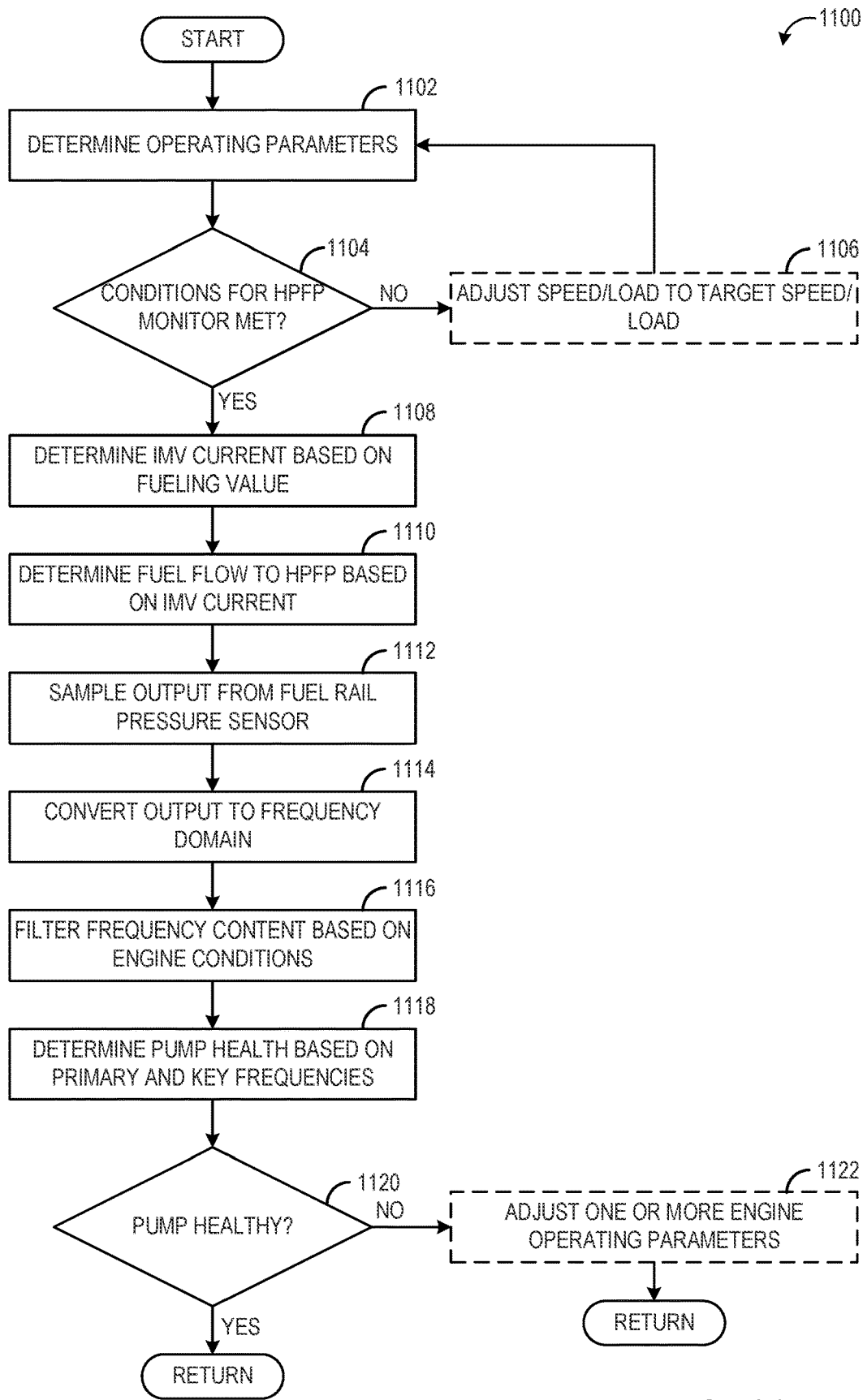
FIG. 11 is a flowchart illustrating a method for diagnosing a high-pressure fuel pump, according to another embodiment of the disclosure.

FIG. 11 is a flowchart illustrating a method 1100 for tracking a degradation condition of a high-pressure fuel pump (HPFP). Instructions for carrying out method 1100 may be executed by a computing system (such as the controller 106 shown by FIG. 1 and/or a remote computing system in communication with the controller) based on instructions stored on a memory of the computing system and in conjunction with signals received from a control unit and sensors of the engine system, such as the sensors (e.g., rail pressure sensor 130 or rail pressure sensors 130a, 130b) described above with reference to FIGS. 1 and 2. The computer system may employ certain actuators that are part of the engine system (e.g., such as the fuel injectors or the like) to adjust engine operation, according to the methods described below. Method 1100 may be performed in a vehicle system that includes only one high-pressure fuel pump, such as the system illustrated in FIG. 1.

At 1102, method 1100 includes determining operating parameters. The determined operating parameters may include, but are not limited to, engine speed, engine load, commanded and/or measured IMV position, fuel injection amount, fuel rail pressure, fuel rail temperature, and other parameters. At 1104, method 1100 determines if conditions for initiating a high-pressure fuel pump (also referred to as an HPFP) monitor are met. The conditions may include engine speed and/or load being within a target range of engine speeds/loads (e.g., engine speed greater than a first threshold but less than a second threshold, such as greater than 250 RPM and less than 2000 RPM), engine speed/load changing by less than a threshold amount, fuel rail temperature in a target range, and/or other conditions. In some examples, the assessment of the HPFP health performed as described below may be made more robust if the HPFP is operating at 60% or greater saturation, and thus the conditions for monitoring the HPFP may include a fuel flow/demand (e.g., based on engine speed and load) that results in at least 60% saturation of the pump. If the conditions for monitoring the HPFP are not met, method 1100 optionally proceeds to 1106 to adjust engine speed and/or load to reach the target speed/load. For example, if the HPFP monitor has not been executed for a threshold amount of time, or if other diagnostic tests (such as leak tests) indicate a potential HPFP degradation condition, the engine may be commanded to operate with the target speed/load so that monitoring of the HPFP condition may be carried out. The target speed/load may be a speed/load operating point or range of operating points that provides a fuel demand of the engine that results in >60% HPFP saturation. In other examples, when conditions for monitoring the HPFP are not met, method 1100 loops back to 1102 to continue determining operating conditions until the HPFP monitor conditions are met.

If the HPFP monitor conditions are met, method 1100 proceeds to execute the HPFP monitor, while operating with the HPFP monitor conditions. Executing the HPFP monitor includes, at 1108, determining IMV current based on a fueling value. The fueling value may be a commanded fuel injection amount for each cylinder of the engine, based on current engine speed and engine load, for example, and may be determined from a look-up table that utilizes engine speed and load as inputs and fuel injection amount as an output, or may be determined by accessing stored fuel injection commands. The fuel injection amount for each cylinder may then be used to determine how much current to supply to the IMV in order for the IMV to be at a position that will provide a fuel flow to the HPFP to reach the commanded fuel rail pressure. The IMV supply current may be determined via a look-up table stored in memory of the controller that utilizes the fueling value and/or other parameters (e.g., the commanded fuel injection amount and engine speed) as an input and outputs the IMV supply current. The rail pressure may be maintained at the commanded fuel rail pressure so that the fuel injection quantities, which are determined by injection duration commands from the controller, precisely match the engine's instantaneous requirements.

At 1110, method 1100 includes determining fuel flow to the HPFP based on the IMV current. The IMV current value that is supplied to the IMV causes the IMV to be in a given position, and the fuel flow to the HPFP may be determined from the given position of the IMV. For example, the controller may have a table stored in memory that includes the IMV position as a function of the supply current to the IMV, and based on parameters of the low-pressure pump (which may result in knowledge of the flow rate of the fuel from the low-pressure pump to the IMV), the controller may determine the fuel flow to the HPFP. If the vehicle system includes two IMVs, the current value to each IMV may be determined and a separate fuel flow to each HPFP may be determined.

At 1112, method 1100 includes sampling the output from the fuel rail pressure sensor. During execution of the HPFP monitor, the fuel rail pressure sensor output may be sampled for a suitable duration, such as one engine cycle, multiple engine cycles, etc. At 1114, the output from the rail pressure sensor is converted to the frequency domain, thereby generating frequency content of the output of the rail pressure sensor. For example, a fast Fourier transform (FFT), discrete Fourier transform (DFT), a Goertzel algorithm, or other suitable process may be performed to transform the output from the rail pressure sensor from the time domain to the frequency domain.

At 1116, the frequency content may be filtered based on engine conditions. For example, select frequencies may be kept while other frequencies may be filtered out. As an example, when a DFT is applied to generate the frequency content, the frequency band range can be selected based on engine operations, such as speed, which filters out other events (e.g., injection events) and crisps the output/makes the frequency peaks more robust. Other types of filtering may be applied, additionally or alternatively, such as a low-pass filter or a high-pass filter, notch filtering, etc. Further, during the transformation of the output of the rail pressure sensor to the frequency domain, only certain output from the pressure sensor may be transformed. For example, the sampling rate of the pressure sensor may be selected in order to generate frequency content that includes robust peaks and low noise. Further, aspects of the transformation (e.g., of the DFT) may be selected to generate visible and separate peaks, such as aspects of a window function, size/angle to convert, etc.

At 1118, the health of the HPFP is determined based on the frequency content (which may be filtered), specifically a primary frequency and one or more key frequencies. The primary and key frequencies may be identified based on a gear ratio between the HPFP and the engine (when the HPFP is driven by the engine), a speed of the engine, a rotational frequency of the drive shaft of the HPFP, and/or a pumping frequency of the HPFP. As an example, if the HPFP has four plungers/pistons and two cam lobes per plunger/piston, as described above with respect to FIG. 1, the HPFP will have eight pumping actions per revolution of the pump drive/camshaft. The primary pumping frequency may be determined by multiplying the frequency of the pump drive/camshaft rotation (which, in an engine-driven HPFP, may be based on the engine speed and the gear ratio, or may be measured by a position/speed sensor of the HPFP and/or based on a commanded speed of the HPFP when the HPFP is electrically driven) by the number of pumping actions per rotation of the pump drive/camshaft (e.g., in the example HPFP described herein, this would include multiplying the engine speed by the gear ratio and then multiplying that by 8). The key frequencies may be sub-harmonics of the primary frequency, such as ¾, ½, and ¼ frequencies of the primary frequency.

The health of the HPFP may be determined based on the relative magnitude of the primary frequency and the key frequencies. Further, the health of the HPFP may be determined based on the magnitudes of the primary frequency component and key frequency components relative to the magnitudes of the primary frequency component and key frequency components for the HPFP when the HPFP was known to be healthy (e.g., upon manufacture of the HPFP, when the HPFP was first put into operation, etc.). For example, a healthy HPFP may exhibit a relatively high magnitude for the primary frequency component and relatively small magnitudes for the key frequency components (e.g., magnitudes of zero or close to zero). As the HPFP starts to degrade, the magnitudes of the key frequency components may begin to increase, until the key frequency components are the dominant frequency components. Thus, the relative change in over time of the magnitudes of the primary and key frequency components may be indicative of a HPFP that is degraded or on the way to degradation.

Figure 14:
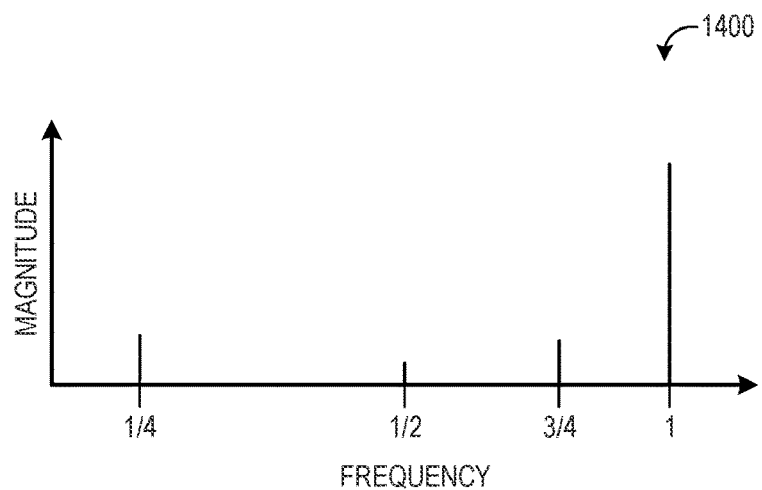
FIGS. 14-16 show example plots of frequency content of a rail pressure sensor, according to embodiments of the disclosure.

FIG. 14 shows an example plot 1400 of select frequency components of frequency content of output from a rail pressure sensor sensing fuel pressure pumped by a health HPFP. In plot 1400, the select frequency components are plotted along the x-axis and a magnitude of each frequency components is plotted along the y-axis. The illustrated frequency components are normalized to the primary frequency, such that the primary frequency is depicted as 1 and the key frequencies are sub-harmonics of 1, herein ¾, ½ and ¼. As appreciated by FIG. 14, a healthy HPFP may exhibit a frequency content signature where the magnitude of the primary frequency is relatively high compared to the magnitudes of the key frequencies.

Figure 15:
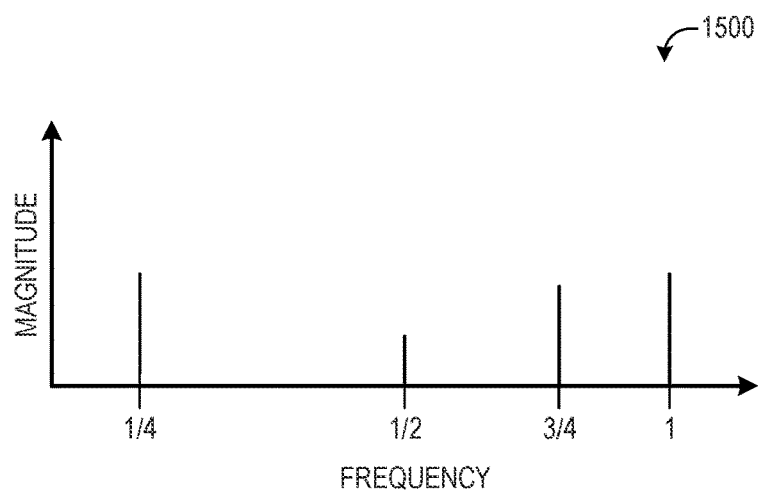
Figure 16:
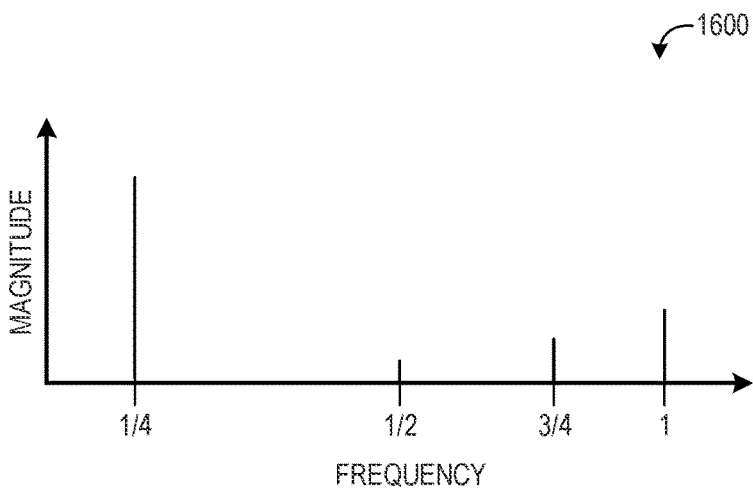

In comparison, FIGS. 15 and 16 illustrate example plots 1500 and 1600, respectively, of select frequency components of frequency content of output from a rail pressure sensor sensing fuel pressure pumped by a degraded HPFP. As shown by plot 1500, the magnitude of the primary frequency may be lowered relative to plot 1400, and the magnitudes of the key frequencies are increased relative to those in plot 1400. Thus, the primary frequency component is no longer the dominant frequency. In plot 1600, the magnitude of the primary frequency is lowered relative to plot 1400, but only one of the magnitudes of the key frequencies has increased relative to the key frequencies of plot 1400. In this specific example, the ¼ frequency component is the dominant frequency. In both example plots 1500 and 1600, the HPFP may be indicated as degraded, due to the shift in the magnitudes of the primary and key frequencies.

At 1120, method 1100 determines if the HPFP is healthy. A healthy HPFP may be indicated if one or more or each of the primary frequency component and key frequency components have a magnitude that is within a threshold of a respective healthy magnitude. As explained above, as the HPFP starts to degrade, the magnitudes of the primary and/or key frequency components may start to change relative to a healthy signature, e.g., the magnitude of the primary frequency component may decrease and/or the magnitudes of one or more of the key frequencies may increase relative to a primary frequency component magnitude and key frequency component magnitudes, respectively, of the HPFP when the HPFP was known to be functional. The HPFP may be determined to be healthy if each of the primary frequency component and the key frequency components are within a threshold (e.g., 5%, 10%) of the respective frequency components when the HPFP was known to be functional. In another example, the HPFP may be determined to be healthy if a cumulative change in each of the primary frequency component and the key frequency components is less than a threshold (e.g., a cumulative change of 5-10% or less). In a still further example, HPFP may be determined to be degraded if the primary frequency component decreases and at least one of the key frequency components increases relative to the respective frequency components when the HPFP was known to be functional.

In some examples, a type of degradation of the HPFP (e.g., degraded check valve, worn cam lobe) may be determined based on the magnitudes of the primary and/or key frequencies. For example, referring to FIG. 16, the ¼ frequency component is preferentially increased; the ½ and ¾ frequency components are similar to the healthy signature shown in FIG. 14. The increase in the ¼ frequency component may indicate that a check valve is degraded, for example.

If the HPFP is determined to be healthy, method 1100 returns. When the HPFP is healthy, current operation may be maintained (or, if engine operation was adjusted to perform the monitor of the HPFP, prior operation may be resumed). In some examples, a notification may be output indicating that the HPFP is healthy. If the HPFP is not determined to be healthy, method 1100 proceeds to 1122 to adjust one or more engine operating parameters responsive to the HPFP degradation condition. The one or more operating parameters that may be adjusted include IMV position, commanded fuel injection amounts, fuel injection timing, and commanded engine speed and/or load, as explained above with respect to FIG. 4. As explained above, when HPFP degradation occurs, normal pressure feedback control may compensate for a while by opening the IMVs to achieve the desired rail pressure. However, it may be desirable to reduce power in order to continue operating until the degraded pump can be serviced/replaced. Additionally, a special "limp-home" operating mode may be executed to provide more margin, and to enable the vehicle to travel to the nearest service facility. The limp-home operating mode may include first determining that the HPFP is operating with a degraded pumping chamber, and then while the HPFP is operating with the degraded pumping chamber, reducing fuel injection amounts, or taking other actions, to force the engine to operate at a lighter load with less fuel, for example. Further, once a weak pump element has been identified, the calibration of the leak detection algorithm may be altered to prevent nuisance fault codes.

Additional operating parameters may be adjusted in response to determining that the HPFP is exhibiting a degradation condition (e.g., not healthy), additionally or alternatively to the parameters listed above. The operating parameters that may be adjusted include engine speed, horse power limits, injection duration limits, exhaust gas recirculation (EGR) levels, skip firing selection of cylinders, and/or disabling engine protections/deration.

For example, in response to determining that the HPFP has degraded, skip fire operation may be executed and/or the current skip fire routine may be adjusted. Skip fire includes selectively fueling some cylinders while not fueling other cylinders (such that combustion only occurs in a subset of the cylinders of the engine each engine cycle). The number of cylinders that are skipped and/or which cylinders are skipped may be adjusted based on the determination of the degraded HPFP. For example, the number of skipped cylinders may be adjusted to increase pump saturation and/or adjust fuel consumption to reach target rail pressure. Further, in some examples, engine protection limits may be disabled and/or other actions may be taken to derate the engine and to let the HPFP work harder when degraded to keep power up.

If the engine is configured to combust gaseous fuel (in combination with liquid fuel), the ratio of fuels may be adjusted if the HPFP is degraded (e.g., more gaseous fuel may be supplied if the HPFP is degraded). In examples where the engine is incorporated in a hybrid system including components to propel the vehicle with electrical energy, the propelling of the vehicle may be performed preferentially with electrical energy in response to determining that the HPFP is degraded. This may include operating the vehicle with lower speed or power to enable sustained electrical energy-based propulsion.

Further still, as explained above, the peaks of the frequency components used herein may become more pronounced at certain engine operating conditions (e.g., high pump saturation). Thus, the engine operating adjustments described above that increase pump saturation may be employed at the start of the monitor to make the frequency signatures described herein more pronounced. Conversely, the engine operating parameters described above that lower pump saturation may be "flipped" to do the diagnostics to increase fuel usage to make signature more pronounced (e.g., decrease gaseous fuel consumption or decrease electrical energy-based propulsion, adjust skip firing, etc.). In particular, skip fire operation may be adjusted (e.g., change the number of skipped or fired cylinders) to help create more separation in the frequency content.

When HPFP degradation is detected, a notification may be output to the operator indicative of the HPFP degradation condition, and a diagnostic code may be stored, similar to the actions taken in response to the degradation condition as described above with respect to FIG. 4. Further, as also explained above, the fuel flow to the HPFP and/or IMV current may be used to determine if the IMV is degraded, in order to further differentiate HPFP issues from IMV issues.

Figure 12:
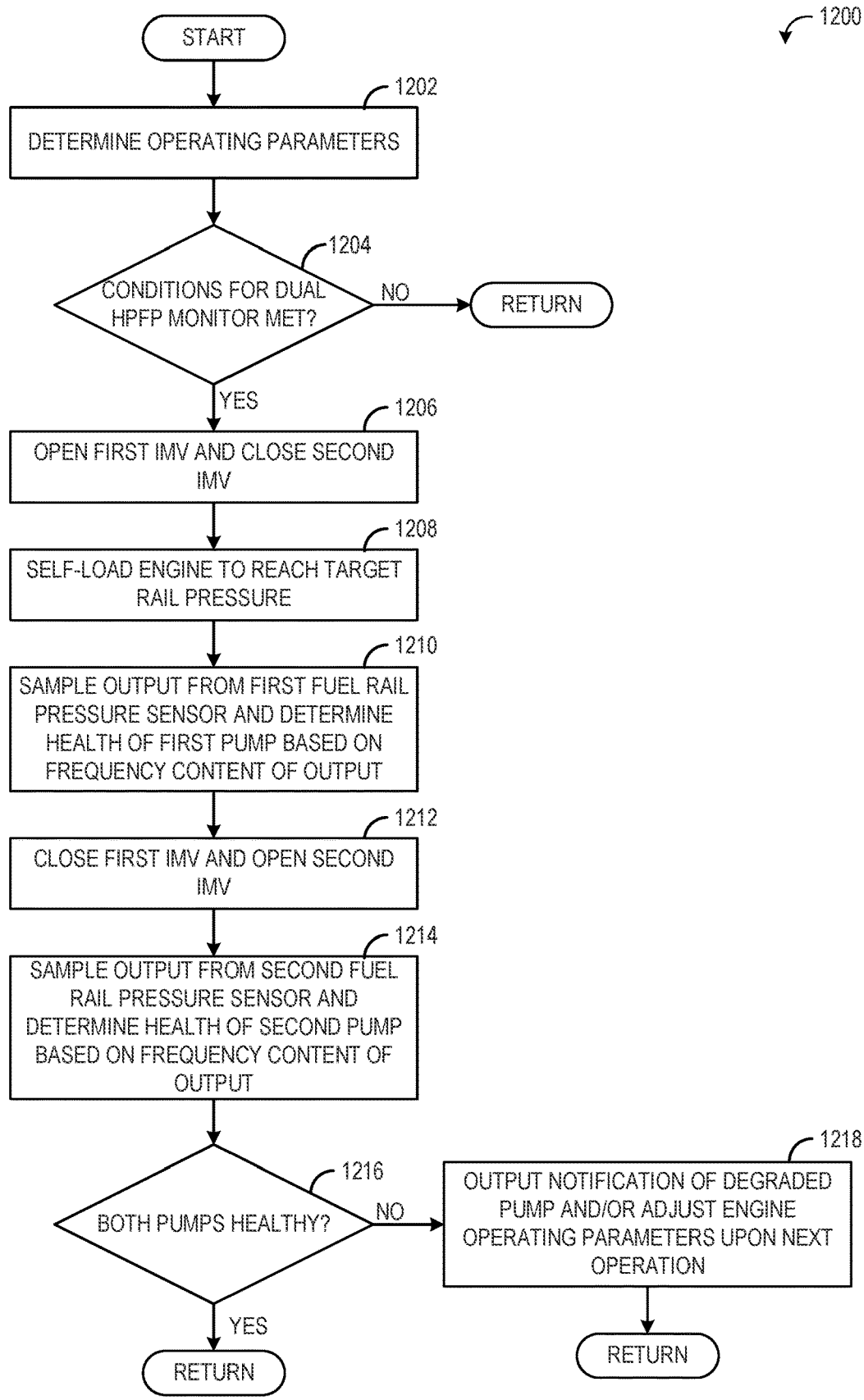
FIG. 12 is a flowchart illustrating a method for diagnosing high-pressure fuel pumps in a dual fuel pump system, according to an embodiment of the disclosure.

FIG. 12 is a flowchart illustrating a method 1200 for tracking a degradation condition of each HPFP in a dual HPFP system. Instructions for carrying out method 1200 may be executed by a computing system (such as the controller 106 shown by FIG. 1 and/or a remote computing system in communication with the controller) based on instructions stored on a memory of the computing system and in conjunction with signals received from a control unit and sensors of the engine system, such as the sensors (e.g., rail pressure sensor 130 or rail pressure sensors 130a, 130b) described above with reference to FIGS. 1 and 2. The computer system may employ certain actuators that are part of the engine system (e.g., such as the fuel injectors or the like) to adjust engine operation, according to the methods described below. Method 1200 may be performed in a vehicle system that includes two high-pressure fuel pumps, such as the system illustrated in FIG. 2.

At 1202, method 1200 includes determining operating parameters. The determined operating parameters may include, but are not limited to, engine speed, engine load, commanded and/or measured IMV position, fuel injection amount, fuel rail pressure, fuel rail temperature, and other parameters. At 1204, method 1200 determines if conditions for initiating a dual high-pressure fuel pump (also referred to as an HPFP) monitor are met. In order to be able to assess the functionality of each HPFP with a single pressure sensor, the HPFPs may be operated in isolation (e.g., fuel may be delivered to only HPFP at a time, such that only one HPFP supplies fuel to the injectors). Because engine operation in order to propel the vehicle may demand both HPFPs, the conditions for executing the dual monitor may include a self-load operation where the vehicle is not being propelled, and energy generated by the engine operation is stored in one or more batteries, dissipated via vehicle resistive grids, etc. Accordingly, the dual HPFP monitor may be executed in response to an operator request to initiate the monitor, during conditions where the vehicle is operating but is not being propelled. If conditions for executing the monitor are not met, method 1200 returns and waits until the conditions are met.

If the conditions for executing the dual HPFP monitor are met, method 1200 proceeds to 1206 to open a first IMV and close a second IMV. For example, IMV 220 may be opened and IMV 222 may be closed, so that fuel only flows to a first HPFP (e.g., pump 202) and not to a second HPFP (e.g., pump 204). At 1208, the engine is operated in a self-load mode to reach a target rail pressure. For example, the engine is fueled via fuel pressurized by the first HPFP. The vehicle is operated in a self-load mode where the engine is operated to drive a generator/alternator, and electrical energy generated by the generator/alternator is stored and/or dissipated (e.g., via resistive grids). The engine is operated with parameters (e.g., fuel injection duration, number of cylinders skipped versus fired, load placed on the engine by the generator/alternator) that allows a target rail pressure to be reached. As explained previously, the frequency content from the rail pressure sensor that is analyzed to assess pump health may be more robust (e.g., higher peaks, less noise) when the operating HPFP is at or close to saturation. Thus, the engine/vehicle parameters may be adjusted so that the first HPFP is operating at 60% or greater saturation. To accomplish this, in one example, the engine is operated at mid-load (e.g., notch 5 when the engine is controlled by a notched throttle). If the target rail pressure is not reached, the engine power may be pulled down (e.g., via the load placed on the engine by the alternator or another mechanism) and then the engine power (e.g., horsepower) may be regulated in order to get the rail pressure to stabilize.

At 1210, the output from the first pressure sensor (e.g., sensor 130*a*) is sampled and used to determine the health of the first HPFP, based on the frequency content of the rail pressure sensor. The sampling of the first rail pressure sensor, transformation of the sampled output to the frequency domain, optional filtering of the frequency content, and analysis of the frequency content to assess the health of the first HPFP may each be performed in the same or similar manner as the sampling of the fuel rail pressure sensor, transformation of the sampled output to the frequency domain, optional filtering of the frequency content, and analysis of the frequency content to assess the health of the HPFP described above with respect to FIG. 11.

At 1212, the first IMV is closed and the second IMV is opened, so that pressurized fuel is supplied to the injectors by the second HPFP and not by the first HPFP. At 1214, the output from the second pressure sensor (e.g., sensor 130*b*) is sampled and used to determine the health of the second HPFP, based on the frequency content of the rail pressure sensor. The sampling of the second rail pressure sensor, transformation of the sampled output to the frequency domain, optional filtering of the frequency content, and analysis of the frequency content to assess the health of the second HPFP may each be performed in the same or similar manner as the sampling of the fuel rail pressure sensor, transformation of the sampled output to the frequency domain, optional filtering of the frequency content, and analysis of the frequency content to assess the health of the HPFP described above with respect to FIG. 11.

At 1216, method 1200 determines if both HPFPs were determined to be healthy. The determination of whether the HPFPs are healthy may be performed in the same manner as the determination of whether the HPFP was healthy as described above with respect to FIG. 11. If both HPFPs are determined to be healthy, method 1200 returns. If both HPFPs are not determined to be healthy (e.g., if one or both of the HPFPs are determined to be degraded), method 1200 proceeds to 1218 to output a notification of the degraded HPFP(s) and/or adjust one or more engine operating parameters upon the next vehicle operation. Because the dual HPFP monitor is carried out when the vehicle is not being propelled, upon determining that one of the HPFPs is degraded, engine operating parameters may not be immediately adjusted (e.g., the engine may be shut down upon completion of the monitor), and in some examples, the degraded HPFP may be serviced/replaced prior to any further operation of the vehicle (e.g., when the monitor is carried out at a rail yard, during regular maintenance of the vehicle, etc.). However, if the vehicle is operated after the degraded HPFP is detected but before the degraded HPFP is serviced or replaced, one or more engine operating parameters may be adjusted during the next operation. The adjusted operating parameters may be the same or similar to the adjusted operating parameters discussed above with respect to FIG. 11 (e.g., the engine may be derated, skip operation adjusted, EGR adjusted, fuel injection amounts adjusted, etc.), to enable operation of the engine with only a single HPFP (e.g., the non-degraded pump) or with both HPFPs, one of which is degraded. Method 1200 then returns.

While method 1200 was described above as including sampling the output of the fuel pressure sensor associated with the operating HPFP, in some examples, the output of both pressure sensors may be sampled, with the output of the pressure sensor associated with the non-operating HPFP providing a secondary check or confirmation of the determination of the health of the operating HPFP. For example, the frequency content of the pressure sensor associated with the non-operating HPFP may also exhibit a shift in magnitudes of the primary and key frequencies, though in some examples to a lesser extent and/or with more noise. Thus, the output from the pressure sensor associated with the non-operating pump may be assessed to confirm the health of the operating pump as determined based on the output of the pressure sensor associated with the operating pump.

Figure 13:
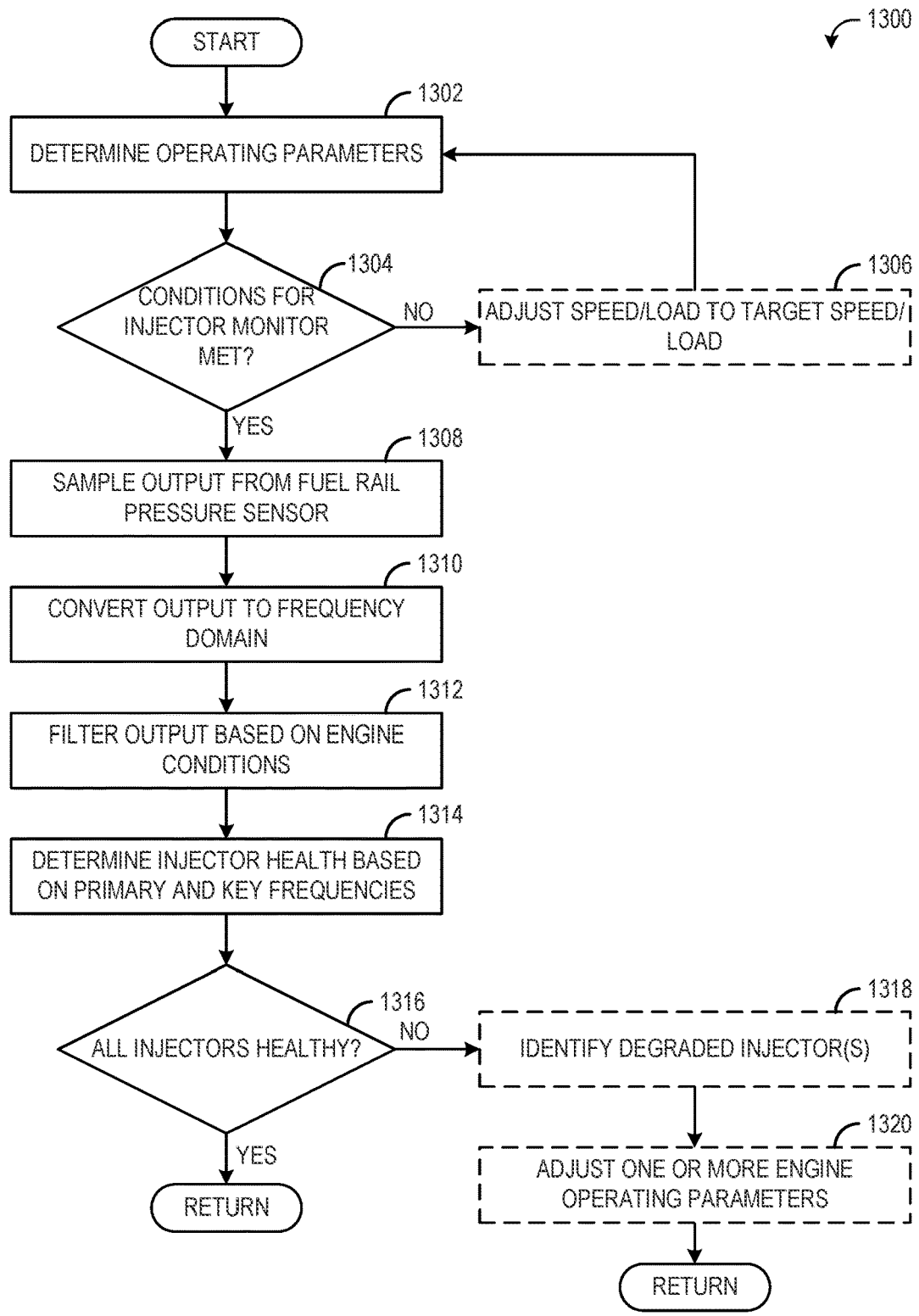
FIG. 13 is a flowchart illustrating a method for diagnosing an injector, according to an embodiment of the disclosure.

Turning now to FIG. 13, it shows a flowchart illustrating a method for tracking a degradation condition of one or more fuel injectors of an engine. Instructions for carrying out method 1300 may be executed by a computing system (such as the controller 106 shown by FIG. 1 and/or a remote computing system in communication with the controller) based on instructions stored on a memory of the computing system and in conjunction with signals received from a control unit and sensors of the engine system, such as the sensors (e.g., rail pressure sensor 130 or rail pressure sensors 130*a*, 130*b*) described above with reference to FIGS. 1 and 2. The computer system may employ certain actuators that are part of the engine system (e.g., such as the fuel injectors or the like) to adjust engine operation, according to the methods described below.

At 1302, method 1300 includes determining operating parameters. The determined operating parameters may include, but are not limited to, engine speed, engine load, commanded and/or measured IMV position, fuel injection amount, fuel rail pressure, fuel rail temperature, and other parameters. At 1304, method 1300 determines if conditions for initiating a fuel injector monitor are met. The conditions for initiating the fuel injector monitor may be the same or similar as the conditions for initiating the HPFP monitor, e.g., target engine speed and load, >60% HPFP saturation, etc.

If the conditions for monitoring the fuel injectors are not met, method 1300 optionally proceeds to 1306 to adjust engine speed and/or load to reach a target speed/load for carrying out the fuel injector monitor. For example, if the fuel injector monitor has not been executed for a threshold amount of time, or if other diagnostic tests indicate a potential fuel injector degradation condition, the engine may be commanded to operate with the target speed/load so that monitoring of the fuel injector condition may be carried out. The target speed/load may be a speed/load operating point or range of operating points that provides a fuel demand of the engine that results in >60% HPFP saturation, or other suitable condition. In other examples, when conditions for monitoring the fuel injectors are not met, method 1300 loops back to 1302 to continue determining operating conditions until the fuel injector monitor conditions are met.

If the fuel injector monitor conditions are met, method 1300 proceeds to execute the fuel injector monitor. Executing the fuel injector monitor includes, at 1308, sampling the output from the fuel rail pressure sensor. During execution of the fuel injector monitor, the fuel rail pressure sensor output may be sampled for a suitable duration, such as one engine cycle, multiple engine cycles, etc. At 1310, the output from the rail pressure sensor is converted to the frequency domain, thereby generating frequency content of the output of the rail pressure sensor. For example, a fast Fourier transform (FFT), discrete Fourier transform (DFT), a Goertzel algorithm, or other suitable process may be performed to transform the output from the rail pressure sensor from the time domain to the frequency domain.

At 1312, the frequency content may be filtered based on engine conditions. For example, select frequencies may be kept while other frequencies may be filtered out. As an example, when a DFT is applied to generate the frequency content, the frequency band range can be selected based on engine operations, such as HPFP speed/pumping frequency, which filters out other events (e.g., HPFP pumping actions) and crisps the output/makes the frequency peaks more robust. Other types of filtering may be applied, additionally or alternatively, such as a low-pass filter or a high-pass filter, notch filtering, etc. Further, during the transformation of the output of the rail pressure sensor to the frequency domain, only certain output from the pressure sensor may be transformed. For example, the sampling rate of the pressure sensor may be selected in order to generate frequency content that includes robust peaks and low noise. Further, aspects of the transformation (e.g., of the DFT) may be selected to generate visible and separate peaks, such as aspects of a window function, size/angle to convert, etc.

At 1314, the health of the fuel injectors is determined based on the frequency content (which may be filtered), specifically a primary frequency and one or more key frequencies. The primary and key frequencies may be identified based on engine speed, the number of cylinders in the engine, and how many fuel injectors are active/injecting fuel. As an example, if the engine has 4 cylinders, as described above with respect to FIG. 1, and each injector is activated to deliver fuel, two injection events will occur per revolution of the engine crankshaft. The primary injection frequency may be determined by multiplying the engine speed (e.g., 2500 RPM) by the number of injection events per revolution of the engine (e.g., 2). The key frequencies may be sub-harmonics of the primary frequency, such as the ½ order frequency.

The health of the fuel injectors may be determined based on the relative magnitude of the primary frequency and the one or more key frequencies. Further, the health of the fuel injectors may be determined based on the magnitudes of the primary frequency component and one or more key frequency components relative to the magnitudes of the primary frequency component and key frequency components for the fuel injectors when the fuel injectors were known to be healthy (e.g., upon manufacture of the engine, when the engine was first put into operation, etc.). For example, when all fuel injectors are healthy, the frequency content of the output from the rail pressure sensor may exhibit a relatively high magnitude for the primary frequency component and relatively small magnitudes for the key frequency components (e.g., magnitudes of zero or close to zero). The rail pressure sensor may sense a drop in rail pressure each time a fuel injection event occurs, which may be represented in the primary frequency component. If a fuel injector degrades and is unable to perform discrete fuel injection events (e.g., the fuel injector is stuck closed and cannot open, or the fuel injector is stuck at least partially open), a measurable drop in fuel rail pressure may not be detected at the commanded fuel injection time for the degraded fuel injector. This lack of injection may cause a shift in the dominant frequency component away from the primary frequency component to a key frequency component. Thus, the relative change in over time of the magnitudes of the primary and one or more key frequency components may be indicative of a fuel injector that is degraded or on the way to degradation.

At 1316, method 1300 determines if all fuel injectors are indicated as being healthy. All fuel injectors may be determined to be healthy when the primary frequency component is the dominant frequency component, e.g., the primary frequency component has a magnitude within a threshold (e.g., within 5-10%) of the magnitude of the primary frequency component when all fuel injectors are known to be healthy and/or the one or more key frequency components are not the dominant frequency components, e.g., the key frequency component has a magnitude within a threshold (e.g., within 5-10%) of the magnitude of the key frequency component when all fuel injectors are known to be healthy.

If the fuel injectors are all determined to be healthy, method 1300 returns. When each fuel injector is healthy, current operation may be maintained (or, if engine operation was adjusted to perform the monitor of the fuel injectors, prior operation may be resumed). In some examples, a notification may be output indicating that the fuel injectors are healthy. If each fuel injector is not determined to be healthy, for example if the frequency content of the rail pressure sensor indicates a shift in frequency content away from the primary frequency, method 1300 proceeds to 1318 to optionally identify the degraded injector(s). To identify the degraded injector, various routines may be executed, such as sequentially turning off each fuel injector and analyzing the rail pressure sensor output in order to see if the frequency content changes (indicating that fuel injector is healthy) or if the frequency content remains the same (indicating that fuel injector is degraded). As another example, a degraded fuel injector may be identified by analyzing the output of the rail pressure sensor in the time domain, similar to the HPFP monitor described above with respect to FIGS. 3-10. For example, each fuel injection event may cause a drop in fuel rail pressure relative to an average rail pressure, and thus the output from the rail pressure sensor over one or two engine cycles may be plotted to identify a loss of a peak/valley corresponding to a degraded fuel injector. Because the rail pressure sensor is also sensing the pumping actions of the HPFP, the output from the rail pressure sensor may be filtered, windowed, sampling rate of the pressure sensor adjusted, etc., in order to differentiate pressure changes due to fuel injection events from pressure changes due to HPFP pumping actions. If a loss of a peak/valley is detected, the degraded fuel injector may be identified based on engine position at the time of the pressure measurements during the loss of the peak/valley. Further, different types of degradation may be identified based on the loss of the peak/valley. For example, if a peak/valley is missing (e.g., the signal is essentially flat where an expected peak would be located), a first type of degradation may be inferred (e.g., fuel injector stuck closed). If a peak/valley is weak (e.g., the peak or the valley is smaller than expected), a second type of degradation may be inferred (e.g., the injector may be able to open and close, but may not be able to fully open such that less fuel than expected is delivered).

At 1320, one or more engine operating parameters may be adjusted responsive to detecting the degraded injector(s). The one or more operating parameters that may be adjusted include disabling commanded combustion in the cylinder with the degraded injector (e.g., treating the cylinder as a skipped cylinder) and correspondingly increasing fuel injection amounts to one or more other cylinders of the engine. In some examples, the adjusted operating parameters may be based on the type of degradation. For example, if an injector is determined to be weakly functional as described above (such that fuel is delivered, but a smaller amount than expected), the fuel injection duration for that injector may be increased. Method 1300 then returns.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A fuel system, comprising:
   a fuel pump operable to increase fuel pressure from a first pressure to a second pressure, the fuel pump including a plurality of pumping chambers, each pumping chamber including a piston actuatable by one or more cam lobes coupled to a common pump drive shaft, and each pumping chamber further including a respective check valve;
   a common fuel rail fluidly coupled to the fuel pump and to a fuel injector, and the fuel injector is operable to inject fuel to a cylinder of an engine;
   a pressure sensor operable to detect a pressure of fuel in the common fuel rail; and
   a controller operable to:
      receive an output pressure signal from the pressure sensor;
      transform the output pressure signal to the frequency domain to generate frequency content of the output pressure signal;
      diagnose a condition of the fuel pump based at least in part on the frequency content of the output pressure signal; and
      differentiate between degradation of a fuel flow control valve upstream of the fuel pump and degradation of the fuel pump.

2. The fuel system of claim 1, wherein the controller is operable to identify a primary frequency component of the frequency content and one or more key frequency components of the frequency content and diagnose the condition of the fuel pump based at least in part on the primary frequency component of the frequency content and one or more key frequency components of the frequency content.

3. The fuel system of claim 2, wherein the controller is operable to diagnose the fuel pump as being degraded in response to a magnitude of the primary frequency component changing relative to an expected primary magnitude and/or in response to a respective magnitude of one or more of the one or more key frequency components changing relative to a respective expected key magnitude.

4. The fuel system of claim 2, wherein the controller is operable to identify the primary frequency component based on a rotational frequency of the fuel pump drive shaft and a number of fuel pump pumping actions per rotation of the fuel pump drive shaft.

5. The fuel system of claim 1, wherein the controller is operable to adjust one or more engine operating parameters in response to the diagnosed condition of the fuel pump comprising a degradation condition.

6. The fuel system of claim 5, wherein the one or more engine operating parameters comprise one or more of a fuel injection timing, an inlet metering valve position, an engine speed, an engine horse power limit, an injection duration limit, an exhaust gas recirculation level, a selection of cylinders of the engine to be skip fired, and engine protection or deration parameters.

7. A fuel system controller configured to:
receive an output pressure signal from a pressure sensor;
transform the output pressure signal to the frequency domain to generate frequency content of the output pressure signal;
diagnose a condition of a fuel pump based at least in part on the frequency content of the output pressure signal, the fuel pump fluidly coupled to a fuel injector via a common fuel rail, and the fuel injector is operable to inject fuel to a cylinder of an engine; and
differentiate between degradation of a fuel flow control valve upstream of the fuel pump and degradation of the fuel pump.

8. The fuel system controller of claim 7, wherein the diagnosis is responsive to a magnitude of a primary frequency component of the frequency content changing relative to an expected primary magnitude and/or responsive to a respective magnitude of one or more key frequency components of the frequency content changing relative to a respective expected key magnitude.

9. The fuel system controller of claim 7, wherein the controller is operable to diagnose a degraded check valve of the fuel pump.

10. The fuel system controller of claim 7, wherein the controller is operable to diagnose a degraded cam lobe of the fuel pump.

11. The fuel system controller of claim 7, wherein the controller is operable to adjust one or more engine operating parameters responsive to diagnosing the condition of the fuel pump.

12. The fuel system controller of claim 11, wherein the one or more engine operating parameters comprise one or more of a fuel injection timing, an inlet metering valve position, an engine speed, an engine horse power limit, an injection duration limit, an exhaust gas recirculation level, a selection of cylinders of the engine to be skip fired, and engine protection or deration parameters.

13. The fuel system controller of claim 7, wherein the controller is operable to output a notification of the diagnosed condition and/or set a diagnostic code responsive to diagnosing the condition.

14. The fuel system controller of claim 7, wherein the controller is configured to, prior to receiving the output pressure signal from the pressure sensor, adjust one or more engine operating parameters in order to operate the fuel pump at 60% or greater saturation.

15. The fuel system controller of claim 7, wherein the controller is configured to diagnose a condition of the fuel injector based at least in part on the frequency content of the output pressure signal.

16. A fuel system for a vehicle, comprising:
a first fuel pump;
a second fuel pump, each of the first fuel pump and the second fuel pump including a plurality of pumping chambers, each pumping chamber including a piston actuatable by one or more cam lobes coupled to a common pump drive shaft, and each pumping chamber further including a respective check valve;
a common fuel rail fluidly coupled to the first fuel pump and/or the second fuel pump and to a fuel injector, and the fuel injector is operable to inject fuel to a cylinder of an engine;
a first pressure sensor operable to detect a pressure of fuel output by the first fuel pump;
a first inlet metering valve (IMV) positioned upstream of the first fuel pump;
a second pressure sensor operable to detect a pressure of fuel output by the second fuel pump;
a second IMV positioned upstream of the second fuel pump; and
a controller operable to:
open the first IMV and close the second IMV to operate the engine with only the first fuel pump;
receive a first output pressure signal from the first pressure sensor;
transform the first output pressure signal to the frequency domain to generate first frequency content of the first output pressure signal;
close the first IMV and open the second IMV to operate the engine with only the second fuel pump;
receive a second output pressure signal from the second pressure sensor;
transform the second output pressure signal to the frequency domain to generate second frequency content of the second output pressure signal; and
diagnose a condition of the first fuel pump and/or the second fuel pump based at least in part on the first frequency content and the second frequency content.

17. The fuel system of claim 16, wherein the controller is operable to open the first IMV and close the second IMV to operate the engine with only the first fuel pump during a self-load mode where the engine is operating but the vehicle is not being propelled.

18. The fuel system of claim 16, wherein controller is operable to diagnose the first fuel pump as being degraded in response to a magnitude of a primary frequency component of the first frequency content changing relative to an expected primary magnitude and/or in response to a respective magnitude of one or more key frequency components of the first frequency content changing relative to a respective expected key magnitude.

* * * * *